US012204269B2

(12) United States Patent
Motohashi et al.

(10) Patent No.: US 12,204,269 B2
(45) Date of Patent: Jan. 21, 2025

(54) IMAGE FORMING APPARATUS INCLUDING MOVABLE BRUSH MEMBER

(71) Applicant: CANON KABUSHIKI KAISHA, Tokyo (JP)

(72) Inventors: Satoru Motohashi, Chiba (JP); Shuhei Tokiwa, Tokyo (JP); Kuniaki Tamagaki, Kanagawa (JP); Tsubasa Yoshida, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/495,858

(22) Filed: Oct. 27, 2023

(65) Prior Publication Data

US 2024/0152086 A1 May 9, 2024

(30) Foreign Application Priority Data

Nov. 9, 2022 (JP) ................................ 2022-179231

(51) Int. Cl.
*G03G 21/00* (2006.01)

(52) U.S. Cl.
CPC . *G03G 21/0035* (2013.01); *G03G 2215/0089* (2013.01)

(58) Field of Classification Search
CPC ............. G03G 15/161; G03G 21/0035; G03G 2215/1647; G03G 2215/1661; G03G 2215/1652; G03G 2215/1657; G03G 2221/0089; G03G 2221/1627
USPC .................... 399/71, 99, 302, 308, 353, 345
See application file for complete search history.

(56) References Cited

U.S. PATENT DOCUMENTS

| | | | | |
|---|---|---|---|---|
| 5,655,203 | A * | 8/1997 | Thayer | G03G 21/0035 399/345 |
| 7,899,354 | B2 | 3/2011 | Handa et al. | |
| 9,405,234 | B2 | 8/2016 | Iida et al. | |
| 9,971,298 | B2 | 5/2018 | Matsukawa | |
| 10,095,150 | B2 | 10/2018 | Hiramatsu | |
| 10,209,668 | B2 | 2/2019 | Matsukawa | |
| 11,860,566 | B2 | 1/2024 | Kanazawa | |

(Continued)

FOREIGN PATENT DOCUMENTS

| | | |
|---|---|---|
| JP | H04-321069 A | 11/1992 |
| JP | H08-190329 A | 7/1996 |

(Continued)

OTHER PUBLICATIONS

Office Action dated Sep. 24, 2024, in Japanese Patent Application No. 2022-179231.

*Primary Examiner* — Robert B Beatty
(74) *Attorney, Agent, or Firm* — Venable LLP

(57) ABSTRACT

An image forming apparatus includes a brush member that includes a fiber yarn and that can come into contact with a surface of an image bearing member at a downstream of a transfer member and at an upstream of a charging member in a rotation direction of the image bearing member. The image bearing member and the brush member are relatively movable to a first position at which a leading end of the fiber yarn separates from the surface of the image bearing member, and a second position at which the leading end of the fiber yarn comes into contact with the surface of the image bearing member. A relative approaching direction of the brush member to the image bearing member upon relative movement from the first position to the second position is a direction from a downstream side to an upstream side in the rotation direction.

6 Claims, 20 Drawing Sheets

(56) References Cited

U.S. PATENT DOCUMENTS

| | | | | |
|---|---|---|---|---|
| 2006/0210310 | A1* | 9/2006 | Takahashi | G03G 21/0064 399/149 |
| 2008/0107448 | A1* | 5/2008 | Takahashi | G03G 21/0064 399/149 |
| 2010/0310269 | A1 | 12/2010 | Masuda | |
| 2011/0013927 | A1* | 1/2011 | Sugiyama | G03G 15/161 399/99 |
| 2011/0150524 | A1* | 6/2011 | Ishizumi | G03G 15/161 399/101 |
| 2012/0027453 | A1* | 2/2012 | Watanabe | G03G 15/161 399/101 |
| 2015/0117897 | A1* | 4/2015 | Shibuya | G03G 15/168 399/101 |
| 2024/0085846 | A1 | 3/2024 | Kanazawa | |

FOREIGN PATENT DOCUMENTS

| | | | |
|---|---|---|---|
| JP | 3023192 | B2 | 3/2000 |
| JP | 2001-183905 | A | 7/2001 |
| JP | 2003-263010 | A | 9/2003 |
| JP | 2007-148152 | A | 6/2007 |
| JP | 2008-197249 | A | 8/2008 |
| JP | 2010-032574 | A | 2/2010 |
| JP | 2012-053297 | A | 3/2012 |
| JP | 4997897 | B2 | 8/2012 |
| JP | 2015-215575 | A | 12/2015 |
| JP | 2018-132570 | A | 8/2018 |
| JP | 2022-129372 | A | 9/2022 |

* cited by examiner

IMAGE FORMING APPARATUS INCLUDING MOVABLE BRUSH MEMBER

BACKGROUND OF THE INVENTION

Field of the Invention

The present invention relates to an image forming apparatus.

Description of the Related Art

In an image forming apparatus of an electrophotographic system, rotary members such as a photosensitive drum, a charging roller, and a transfer roller are used. Furthermore, there is also generally a technique that places a brush member including fiber yarns in contact with surfaces of rotary members, and clean and perform other processing on the surfaces of the rotary members. For example, Japanese Patent Application Publication No. 2001-183905 discloses a technique that provides a brush member that comes into contact with the surface of a photosensitive drum at a position on a downstream side of a transfer member and on an upstream side of a charging member in a rotation direction of the photosensitive drum, and controls the polarity of an untransferred transfer on the surface of the photosensitive drum. The untransferred toner is scattered by the brush member, and is charged with regular polarity as a result of discharging of a charging roller. Subsequently, the untransferred toner is collected to a developing apparatus by a potential difference between the photosensitive drum and a developing roller, and the surface of the photosensitive drum is refreshed.

To clean the surface of the rotary member and perform charging control on an untransferred toner by the brush member, it is considered to be effective to increase a contact pressure of the brush member against the photosensitive drum. However, the brush member described in Japanese Patent Application Publication No. 2001-183905 is fixed to an apparatus main body in a state where the brush member is in contact with the surface of the photosensitive drum. Hence, due to an attachment state of the brush member at a time of manufacturing or a temporal change in a state due to contact with the photosensitive drum, directions of fiber yarns that constitute the brush become non-uniform, so that there is a probability that it is possible to make a fiber density at the contact position sparse and dense as illustrated in FIGS. 10A and 10B. FIGS. 10A and 10B schematically illustrate a state where a fiber density is sparse at a position A. When the fiber density has sparseness and denseness, a toner is stopped at a portion of a dense fiber density, and these toners flow in a portion of a sparse fiber density, and therefore more toners enter at the portion of the sparse fiber density. A difference in the amount of an entering toner in a longitudinal direction causes non-uniformity of a longitudinal streak-shaped slip-through spot, and is likely to cause faulty image formation of a longitudinal streak shape such as faulty charging or faulty transfer on the rotation direction downstream side of the rotary member.

SUMMARY OF THE INVENTION

The present invention prevents occurrence of faulty image formation in an image forming apparatus that includes a brush member at least part of which can come into contact with a rotary member.

The present invention is an image forming apparatus comprising:

an image bearing member on which an electrostatic latent image is formed, and that is rotatable;

a charging member that charges the image bearing member and is rotatable;

a developing member that develops, as a developer image, the electrostatic latent image formed on the image bearing member;

a transfer member that transfers the developer image to a recording material; and a brush member that includes a fiber yarn and has a flat shape, and that can come into contact with a surface of the image bearing member at a downstream side with respect to the transfer member and at an upstream side with respect to the charging member in a rotation direction of the image bearing member, wherein the image bearing member and the brush member are relatively movable to a first position at which a leading end of the fiber yarn separates from the surface of the image bearing member, and a second position at which the leading end of the fiber yarn comes into contact with the surface of the image bearing member, and a relative approaching direction of the brush member to the image bearing member upon relative movement from the first position to the second position is a direction from a downstream side to an upstream side in the rotation direction of the image bearing member.

The present invention is an image forming apparatus comprising:

an image bearing member on which an electrostatic latent image is formed, and that is rotatable;

a charging member that charges the image bearing member and is rotatable;

a developing member that develops, as a developer image, the electrostatic latent image formed on the image bearing member;

a transfer member that transfers the developer image to a recording material; and a brush member that includes a fiber yarn and has a flat shape, and that can come into contact with a surface of the image bearing member at a downstream side with respect to the transfer member and at an upstream side with respect to the charging member in a rotation direction of the image bearing member, wherein the image bearing member and the brush member are relatively movable to a second position at which a leading end of the fiber yarn comes into contact with the surface of the image bearing member, and a third position at which the leading end of the fiber yarn separates from the surface of the image bearing member, and a relative separating direction of the brush member from the image bearing member upon relative movement from the second position to the third position is a direction from a downstream side to an upstream side in the rotation direction of the image bearing member.

The present invention is an image forming apparatus comprising:

an image bearing member on which an electrostatic latent image is formed, and that is rotatable;

a charging member that charges the image bearing member and is rotatable;

a developing member that develops, as a developer image, the electrostatic latent image formed on the image bearing member;

a transfer member that transfers the developer image to a recording material; and a brush member that includes a fiber yarn and has a flat shape, and that can come into contact with a surface of the image bearing member at a downstream side with respect to the transfer member and at an upstream side with respect to the charging member in a rotation direction of the image bearing member, wherein the image bearing member and the brush member are relatively movable to a first position at which a leading end of the fiber yarn separates from the surface of the image bearing member, a second position at which the leading end of the fiber yarn comes into contact with the surface of the image bearing member, and a third position at which the leading end of the fiber yarn separates from the surface of the image bearing member, and that is different from the first position, and in the rotation direction of the image bearing member, a position of the brush member at the first position is on a downstream side with respect to the position of the brush member at the second position, and the position of the brush member at the third position is on an upstream side with respect to the position of the brush member at the second position.

The present invention is an image forming apparatus comprising:

an image bearing member on which an electrostatic latent image is formed, and that is rotatable;

a charging member that charges the image bearing member and is rotatable;

a developing member that develops, as a developer image, the electrostatic latent image formed on the image bearing member;

a transfer member that transfers the developer image to a recording material; and a brush member that includes a fiber yarn and has a flat shape, and that can come into contact with a surface of the image bearing member at a downstream side with respect to the transfer member and at an upstream side with respect to the charging member in a rotation direction of the image bearing member, wherein the image bearing member and the brush member are relatively movable to a first position at which a leading end of the fiber yarn separates from the surface of the image bearing member, a second position at which the leading end of the fiber yarn comes into contact with the surface of the image bearing member, and a third position at which the leading end of the fiber yarn separates from the surface of the image bearing member, and that is different from the first position, and a relative approaching direction of the brush member to the image bearing member upon relative movement from the first position to the second position, and a relative separating direction of the brush member from the image bearing member upon relative movement from the second position to the third position is a direction from a downstream side to an upstream side in the rotation direction of the image bearing member.

According to the present invention, it is possible to prevent occurrence of faulty image formation in an image forming apparatus that includes a brush member at least part of which can come into contact with a rotary member.

Further features of the present invention will become apparent from the following description of exemplary embodiments with reference to the attached drawings.

DESCRIPTION OF THE EMBODIMENTS

Exemplary embodiments for carrying out the present invention will be described with reference to the drawings.

Embodiment 1

In embodiment 1, a photosensitive drum that is an image bearing member is used is a rotatable rotary member, and a brush member is used as a cleaning member. Hereinafter, preferable embodiments of the present invention will be described in detail in an exemplary manner with reference to the drawings. In this regard, dimensions, materials, shapes, and relative arrangement of components described in these embodiments can be changed as appropriate according to a configuration and various conditions of an apparatus to which the invention is applied, and does not intend to limit the scope of the present invention to the following embodiments.

Configuration of Image Forming Apparatus

Figure 2:
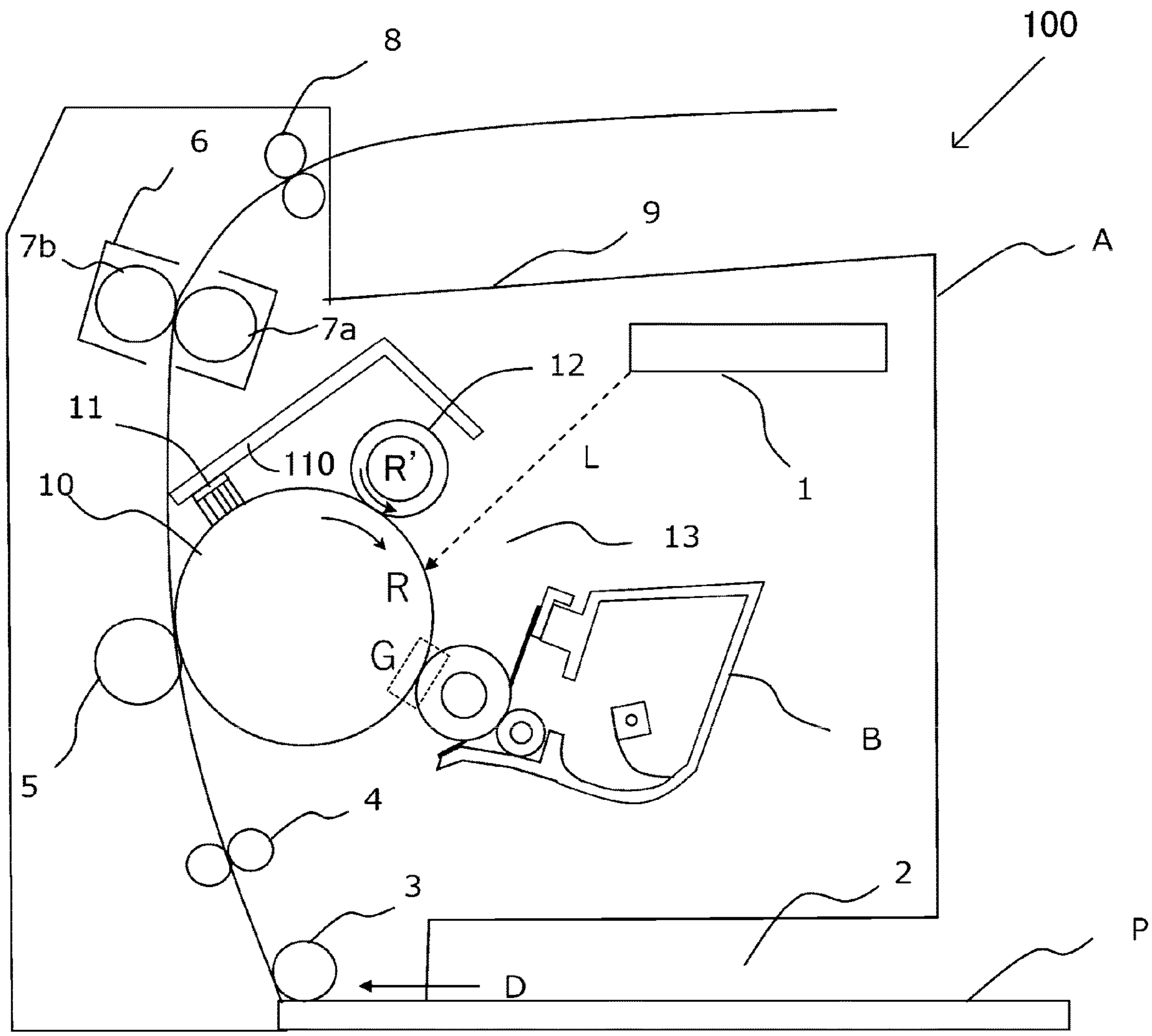
FIG. 2 is a view illustrating an image forming apparatus according to embodiment 1.

In FIG. 2, an image forming apparatus 100 of an electrophotographic system is a laser beam printer in which a cartridge B is attachable to and detachable from an apparatus main body A and that uses an electrophotographic technology. When the cartridge B is attached to the apparatus main body A, an exposure apparatus 1 (laser scanner unit) is disposed on an upper side of the cartridge B.

Furthermore, a sheet tray 2 that houses recording media (hereinafter, referred to as recording materials P) that are image formation targets is disposed on a lower side of the cartridge B.

Furthermore, in the apparatus main body A, a pickup roller 3, a pair of transport rollers 4, a transfer roller 5, a fixing apparatus 6, a pair of discharge rollers 8, a discharge tray 9, and the like are disposed in order along a transport direction D of the recording material P. Note that the fixing apparatus 6 includes a heat roller 7*a* and a pressure roller 7*b*.

Image Forming Process

Next, an outline of the image forming process will be described with reference to FIGS. 2 and 3. A photosensitive drum 10 that is an image bearing member of φ24 is driven to rotate in an arrow R direction at a predetermined circumferential speed (a process speed of 100 mm/sec) based on a print start signal. A charging roller 12 that is applied a bias voltage and rotates in an arrow R' direction contacts the outer circumferential surface of the photosensitive drum 10, and uniformly charges the outer circumferential surface of the photosensitive drum 10. Note that the charging roller 12 may be configured to rotate at the same speed as that of the photosensitive drum 10 following rotation of the photosensitive drum 10, or may be provided with drive means that drives and rotates the charging roller 12, and configured to rotate at a different speed from that of the photosensitive drum 10. An application bias at this time is a direct current voltage of −1100 V, and the photosensitive drum 10 is charged at −500 V. The exposure apparatus 1 outputs laser light L matching image information. This laser light L passes through an exposure window portion 13 on the upper surface of the cartridge B, and scans and exposes the outer circumferential surface of the photosensitive drum 10. Thus, an electrostatic latent image matching the image information is formed on the outer circumferential surface of the photosensitive drum 10.

Figure 3:
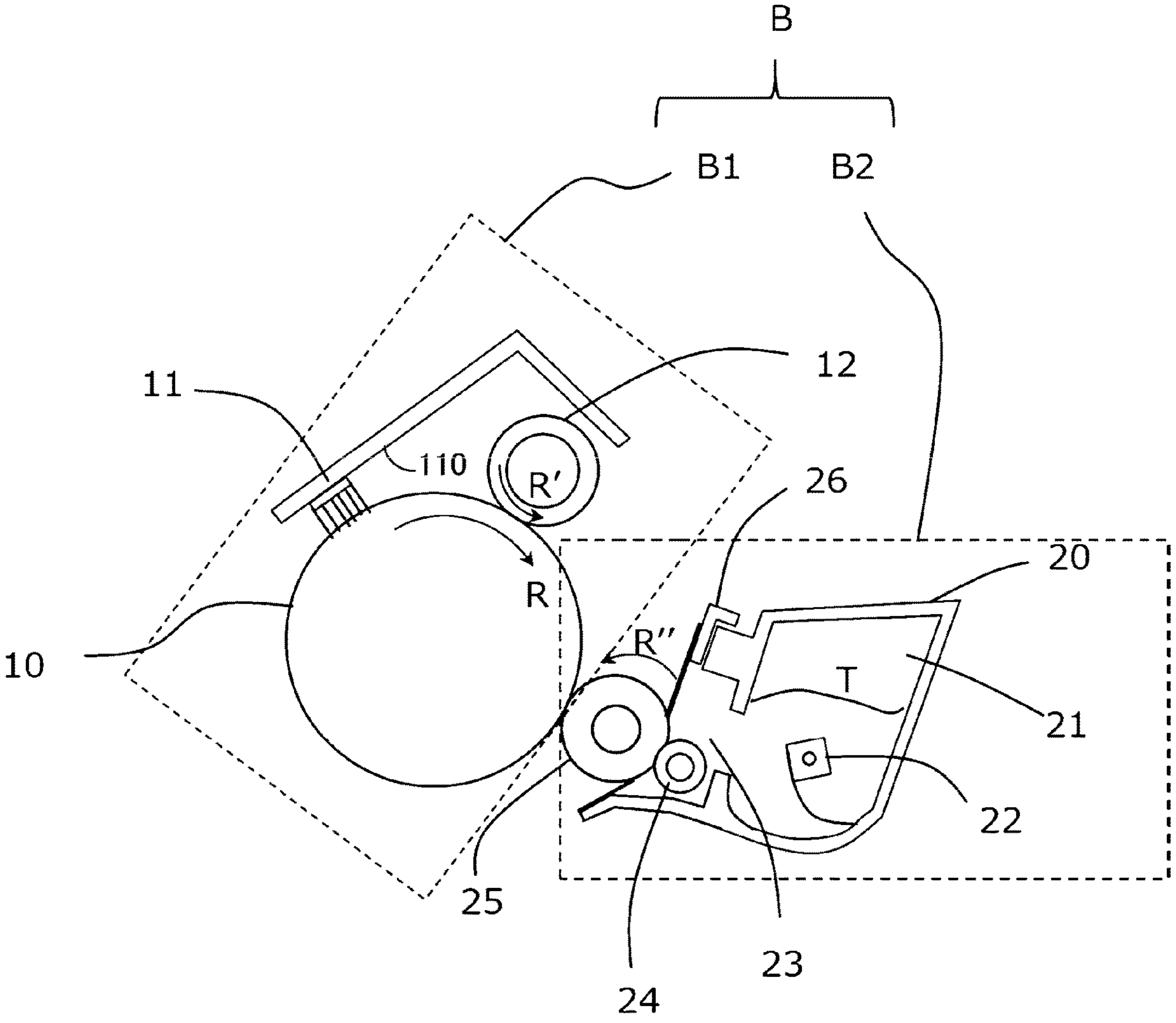
FIG. 3 is an explanatory view of a cartridge according to embodiment 1.

On the other hand, as illustrated in a cross-sectional view of the cartridge in FIG. 3, in a developing unit 20 that is a developing apparatus, a toner T in a toner chamber 21 is made of a non-magnetic single-component developer whose regular polarity is negative polarity, is stirred and transported by rotation of a transport member 22, and is fed to a tonner supply chamber 23. Subsequently, the toner T is borne and transported by a supply roller 24 of φ10 having a sponge shape, and borne on the surface of a developing roller 25 that is made of a conductive rubber that is an elastic body of φ12. The developing roller 25 is driven to rotate in an arrow R" direction at 140 mm/sec at 140% in peripheral velocity ratio with respect to the photosensitive drum with a drive gear of the main body interposed therebetween. Furthermore, the toner T is rubbed and charged with the negative polarity by a developing blade 26 to regulate the layer thickness of the circumferential surface of the developing roller 25. The developing roller 25 is applied a developing bias (−350 V), and the toner T is transferred to the photosensitive drum 10 according to the electrostatic latent image and visualized as a toner image.

Furthermore, as illustrated in FIG. 2, in accordance with an output timing of the laser light L, the pickup roller 3 and the pair of transport rollers 4 feed from the sheet tray 2 the recording material P housed at a lower portion of the apparatus main body A. Furthermore, this recording material P is supplied to a transfer position between the photosensitive drum 10 and the transfer roller 5. At this transfer position, a toner image is sequentially transferred from the photosensitive drum 10 to the recording material P. The recording material P to which the toner image has been transferred is separated from the photosensitive drum 10, and is transported to the fixing apparatus 6. Furthermore, the recording material P passes a nip portion of the heat roller 7*a* and the pressure roller 7*b* that constitute the fixing apparatus 6. This nip portion performs pressure/heat fixing processing on the toner image to fix to the recording material P. The recording material P having been subjected to toner image fixing processing is transported to the pair of discharge rollers 8, and is discharged to the discharge tray 9.

On the other hand, an untransferred toner remaining on the photosensitive drum 10 after transfer is a toner whose polarity becomes positive polarity opposite to the regular polarity as a result of discharging of a transfer bias (+1 kV) applied to the transfer roller 5, and an untransferred toner of the negative polarity that cannot be transferred. The untransferred toner is fed to a contact position of a brush member 11 as the photosensitive drum 10 rotates. The brush member 11 is applied a brush member bias (−350 V) by an unillustrated power supply, and the brush member 11 allows a toner of the negative polarity to pass while retaining the toner of the positive polarity inside, and feeds the toner to a contact position of the charging roller 12. The toner of the positive polarity that has not been retained by the brush member 11 becomes the toner T of the negative polarity as a result of discharging of the charging bias (−1100 V) applied to the charging roller 12 in the vicinity of the contact position of the charging roller 12. Furthermore, as the photosensitive drum 10 rotates, the toner is fed to a developing area G in which the developing roller 25 and the photosensitive drum 10 face each other. In the developing area G, the toner T of the negative polarity is collected from the photosensitive drum 10 to the developing roller 25 side by a potential difference between the photosensitive drum 10 and the developing roller 25, and reused.

Configuration of Cartridge B

Next, an overall configuration of the cartridge B will be described with reference to FIG. 3. The cartridge B includes a latent image unit B1 that includes at least the photosensitive drum 10 and the charging roller 12 and forms a latent image, and a developing unit B2 that includes the toner T, the developing roller 25, the developing blade 26, and the like and develops a latent image. The cartridge B is configured by inserting and positioning each of the latent image unit B1 and the developing unit B2 in the apparatus main body A. Note that the latent image unit B1 may include the brush member 11.

Each driven member equipped by the latent image unit B1 and the developing unit B2 is driven to rotate by a drive force input from drive means of the apparatus main body A.

Configuration of Brush Member 11

Figure 4A:
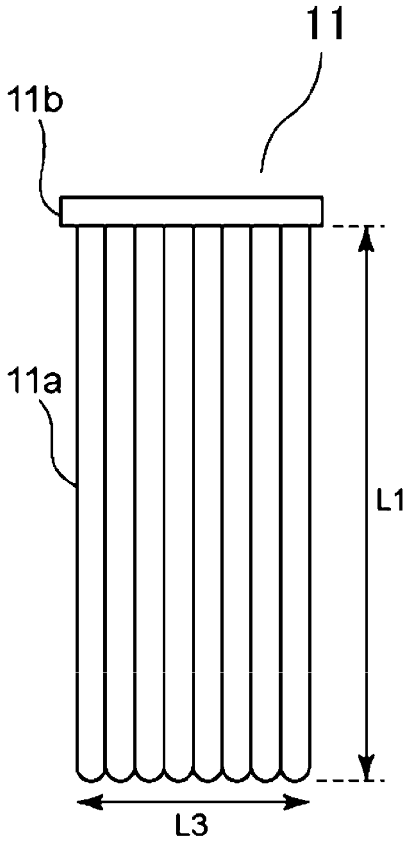
FIGS. 4A and 4B are explanatory views of a brush member according to embodiment 1.

FIG. 4A is a schematic view illustrating the brush member 11 in a single state seen along a longitudinal direction thereof (substantially parallel to a rotary axial direction of the photosensitive drum 10). Furthermore, FIG. 4B is a schematic view illustrating the brush member 11 in a state where the brush member 11 is placed in contact with the photosensitive drum 10 seen along the longitudinal direction thereof.

A brush portion of the brush member 11 is formed by a fixed brush of a flat shape. The fixed brush of the flat shape has an advantage that the fixed brush is reasonable compared to a rotatable brush roller, and can reduce an installation area, so that it is possible to reduce cost of and miniaturize the cartridge B.

Figure 4B:
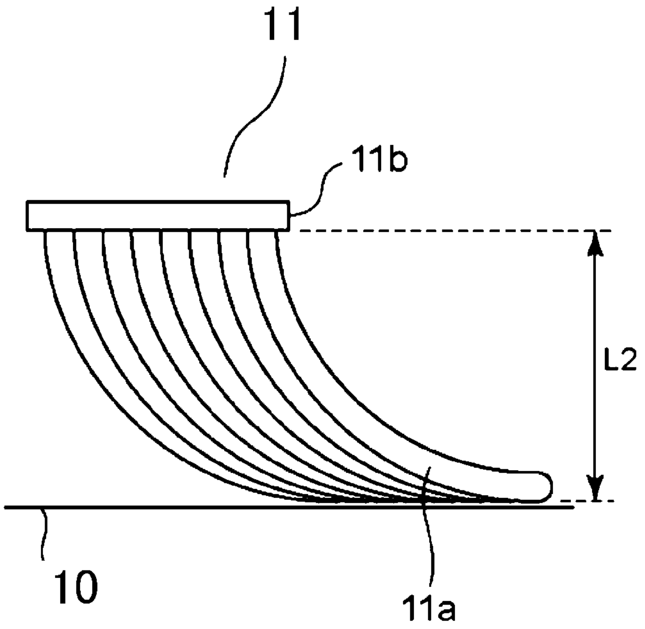

As illustrated in FIGS. 4A and 4B, the brush member 11 includes pile yarns 11*a* that are made of Nylon 6 and are a plurality of bristle materials that rub the surface of the photosensitive drum 10, and a base fabric 11*b* that supports the pile yarns 11*a*. Note that, in addition to nylon, rayon, acrylic, polyester, and the like may be used as a material of the pile yarns 11*a*.

As illustrated in FIG. 4A, a distance from the base fabric 11*b* to a leading end of the exposed pile yarn 11*a* in a single state of the brush member 11, i.e., in a state where a force to bend the pile yarns 11*a* is not applied from an outside is L1. In embodiment 1, L1 is 5.75 mm. The brush member 11 is disposed by fixing the base fabric 11*b* to a support member (not illustrated) installed at a predetermined position of a container frame body by fixing means such as a double-sided adhesive tape such that the leading ends of the pile yarns 11*a* enter the photosensitive drum 10.

As illustrated in FIG. 4B, a shortest distance to the photosensitive drum 10 from the base fabric 11*b* of the brush member 11 fixed to the above support member is L2. The surface of the photosensitive drum 10 and the base fabric 11*b* are substantially parallel in FIG. 4B, yet do not particularly need to be parallel, and are disposed at certain angles in some cases. In this case, too, the shortest distance from the base fabric 11*b* to the photosensitive drum 10 is L2.

Furthermore, a difference between L2 and L1 is defined as an amount of penetration of the brush member 11 in the photosensitive drum 10. In embodiment 1, as illustrated in FIG. 4A, a length L3 of the brush member 11 in a circumferential direction (hereinafter, referred to as a "lateral direction") of the photosensitive drum 10 in the single state of the brush member 11 is 4 mm. Furthermore, in embodiment 1, the length in the longitudinal direction of the brush member 11 is 216 mm. The length in the longitudinal direction of the brush member 11 is the length of an image formation area (an area in which a toner image can be formed) on the photosensitive drum 10 or more in the rotary axial direction of the photosensitive drum 10, so that the brush member 11 can contact the entire image formation area.

The length L3 of the brush member 11 in the lateral direction of the photosensitive drum 10 in embodiment 1 is not limited to the above example. For example, the length L3 may be changed as appropriate according to operational lives of the image forming apparatus 100 and the process cartridge. Furthermore, the length in the longitudinal direction of the brush member 11 in embodiment 1 is not limited to the above example. For example, the length in the longitudinal direction of the brush member 11 may be changed as appropriate according to a maximum paper feeding width of the image forming apparatus 100. Note that the length in the lateral direction of the brush member 11 is preferably 3 mm or more from a viewpoint to support a longer operational life. Furthermore, in embodiment 1, the thickness of the pile yarn 11*a* is 2 deniers, and the density is 240 kF/inch$^2$. Here, kF/inch$^2$ is a unit of the density of a brush, and indicates the number of filaments per square inch. The thickness and the density of the pile yarn 11*a* may be determined as appropriate taking toner passability into account. More specifically, when the thickness of the pile yarn 11*a* is too thick, the pile yarns 11*a* block a toner from passing, and therefore a streak-shaped spot is readily formed. Furthermore, when the density of the pile yarns 11*a* is too high, the pile yarns 11*a* do not allow a toner to pass, and causes the toner stopped by the brush member 11 to scatter and contaminate the interior of the apparatus. Hence, the thickness and the density of the pile yarn 11*a* are preferably 1 to 6 deniers and 150 to 350 kF/inch$^2$, respectively, from the viewpoint of toner passability.

Furthermore, as a numerical value that indicates the degree of sparseness and denseness of the brush of the brush member 11, a Clark-Evans index is used. In a case where a distance from a point i to a nearest neighbor point is di, the number of points is n, and an average value of distances from points to the nearest point is W, the average value W is expressed by following equation 1.

[Math. 1]

$$W = \frac{1}{n}\sum_{i=1}^{n} d_i \qquad \text{(Equation 1)}$$

Here, taking a case where points are distributed at random on a plane of an area S (this distribution conforms to a uniform Poisson distribution) into account as a classification criterion for each distribution, an expectation value E (W) of an average nearest distance W in this case is expressed by following equation 2.

[Math. 2]

$$E(W) \approx \frac{1}{2\sqrt{n/S}} \qquad \text{(Equation 2)}$$

w standardized to compare cases where the numbers of points and the densities are different using the expectation value E (W) is referred to as the Clark-Evans index, and is expressed by following equation 3.

[Math. 3]

$$w = \frac{W}{E(W)} \qquad \text{(Equation 3)}$$

Figure 5B:
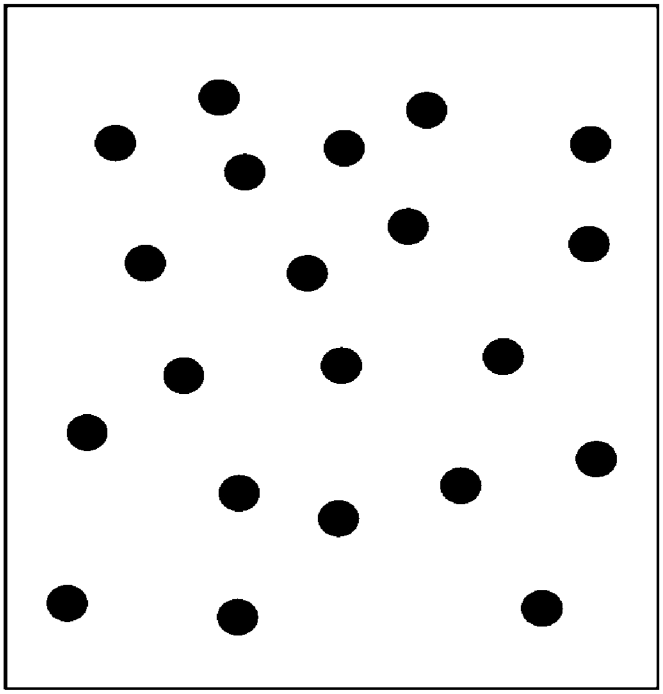
FIGS. 5A and 5B are views of a method for measuring a Clark-Evans index of the brush member according to embodiment 1.
Figure 5A:
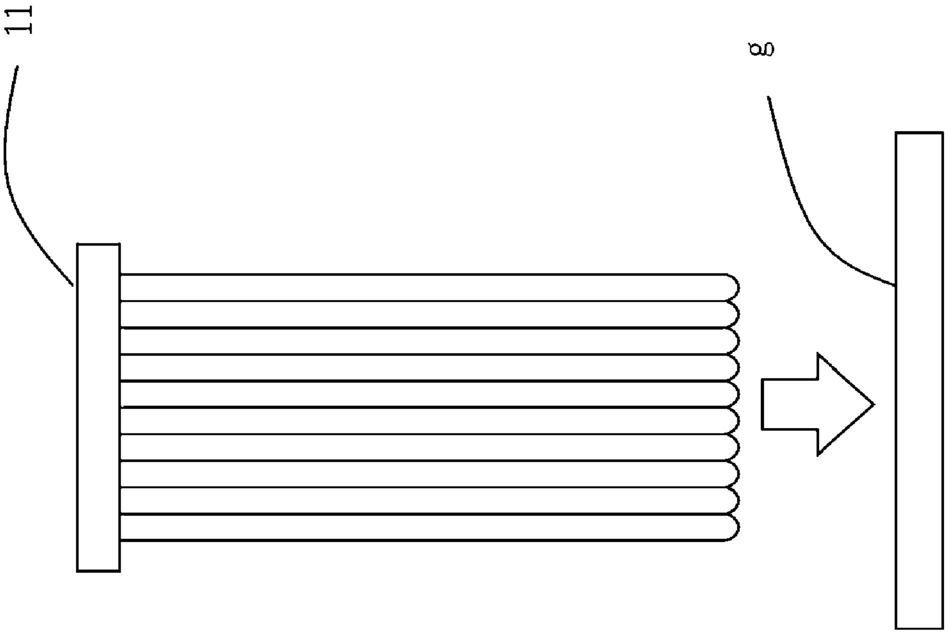

Actually, as illustrated in FIG. 5A, the brush member 11 is pressed against a glass surface g, and positions of the leading ends of the brush observed through an opposite side of the glass surface to the side against which the brush member 11 has been pressed are expressed as points to obtain a distribution of the brush in a certain area (1 mm$^2$) as illustrated in FIG. 5B. The Clark-Evans index is calculated from this distribution of the brush using equations 1 to 3. A condition of the Clark-Evans index w according to the distribution of the brush in embodiment 1 is w≥1.

Contact Pressure of Brush Member 11

Figure 6A:
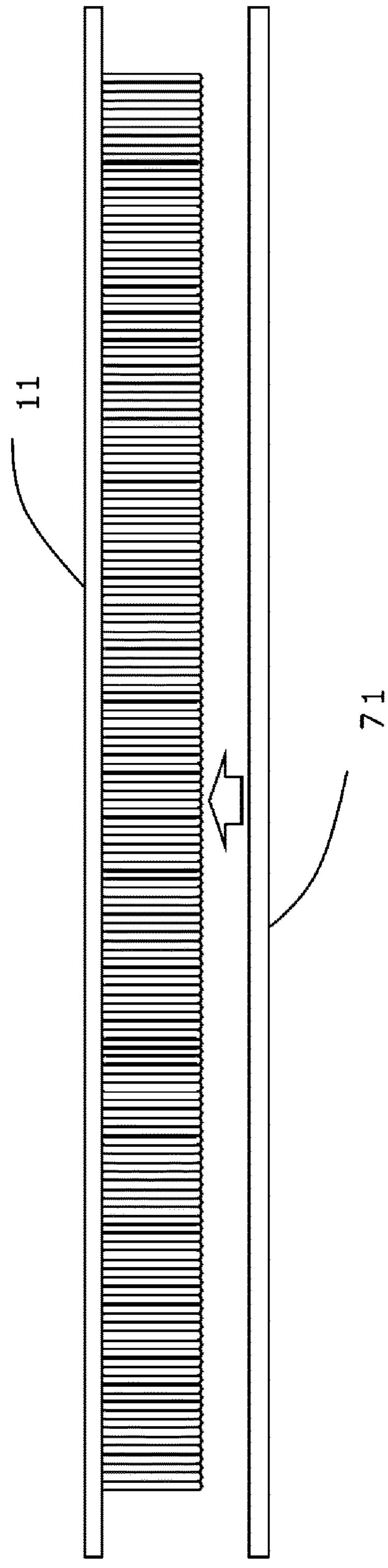
FIGS. 6A and 6B are explanatory views of a contact pressure measuring method according to embodiment 1.
Figure 6B:
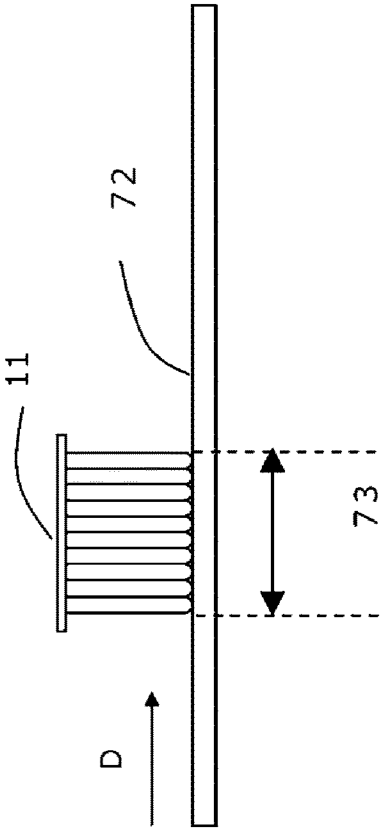

A method for obtaining a maximum contact pressure that is a parameter for controlling a contact state of the brush member 11 at this time will be described. As illustrated in FIG. 6A, a normal force matching the amount of penetration of the brush member 11 in the photosensitive drum 10 is measured using compression test jig 71 for Shimadzu compact table top tester EZTest (Shimadzu Corporation). Furthermore, the brush member 11 is placed in pressure contact with a transparent glass drum 72 that moves in the moving direction D as illustrated in FIG. 6B, and is observed from the glass drum 72 side to measure a contact width 73 in the lateral direction. Here, the average pressure is expressed by following equation 4.

$$\text{average pressure}=\text{normal force}/(\text{contact width}\times\text{longitudinal width})\ (\text{gf/mm}^2) \quad \text{(Equation 4).}$$

Furthermore, a portion at which the amount of penetration of the brush member 11 in the photosensitive drum 10 is the largest is a portion at which the contact pressure is maximum. An average amount of penetration obtained from a maximum amount of penetration and a minimum amount of penetration is expressed by following equation 5.

$$\text{average amount of penetration}=(\text{maximum amount of penetration}+\text{minimum amount of penetration})/2 \quad \text{(Equation 5)}$$

The maximum contact pressure of the brush member 11 on the photosensitive drum 10 is expressed by following equation 6.

$$\text{maximum contact pressure}=\text{average pressure}\times\text{maximum amount of penetration}/\text{average amount of penetration}\ (\text{gf/mm}^2) \quad \text{(Equation 6)}$$

The maximum contact pressure is obtained from conversion formulae of equations 4, 5 and 6. The maximum contact pressure can be calculated according to these conversion formulae in a case where the density and the thickness of the brush member 11 are uniformly made. In this regard, in a case where the density or the thickness of the brush member 11 is not uniformly made in the lateral direction or the like, the average pressure obtained using equation 4 by cutting the brush member 11 to a unit length in the lateral direction is the maximum contact pressure. The maximum contact pressure is preferably 0.7 to 3.5 gf/mm$^2$.

Figure 1A:
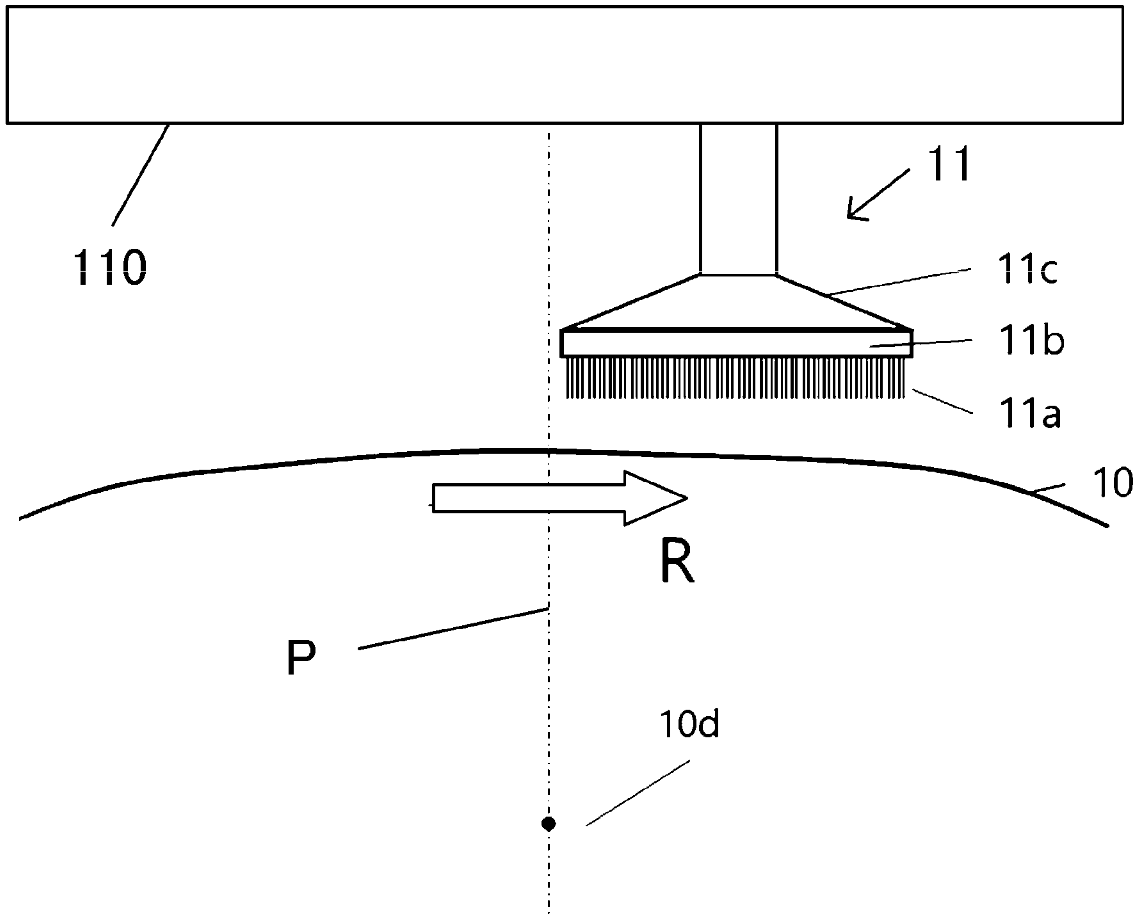
FIG. 1A is an explanatory view of a contacting/separating operation of a brush member according to embodiment 1.
Figure 1B:
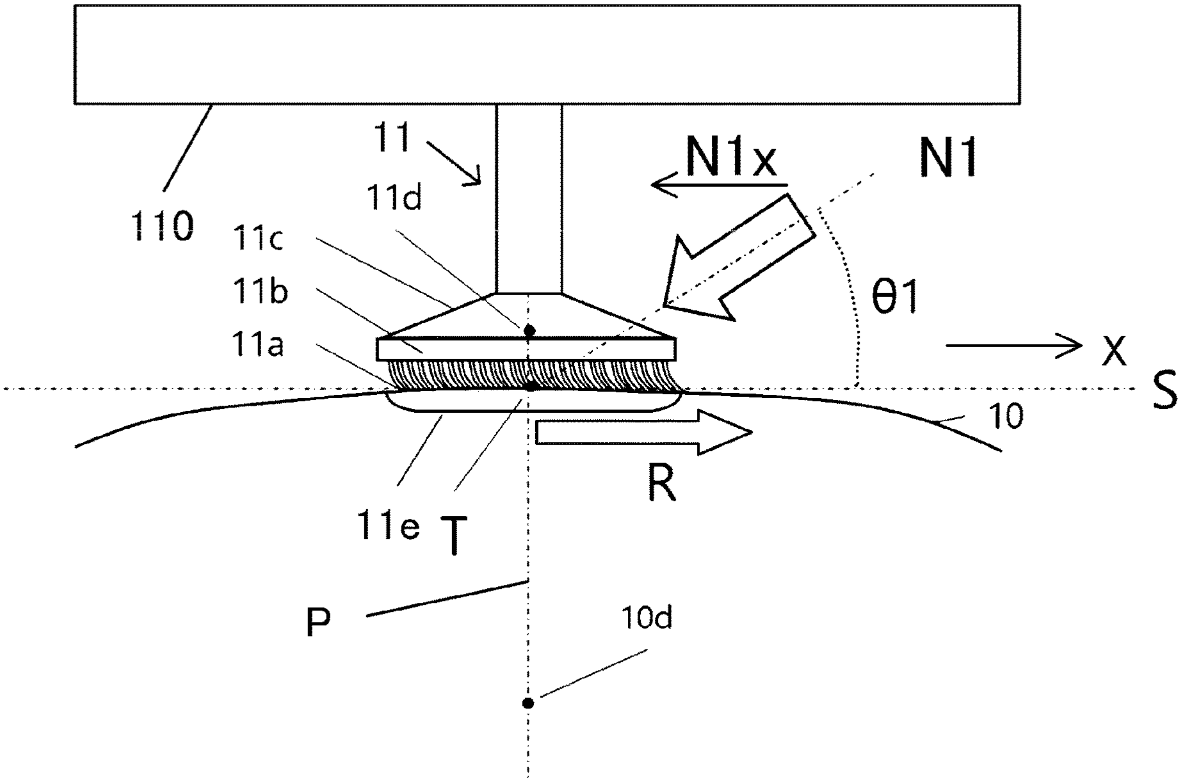
FIG. 1B is an explanatory view of the contacting/separating operation of the brush member according to embodiment 1.
Figure 1C:
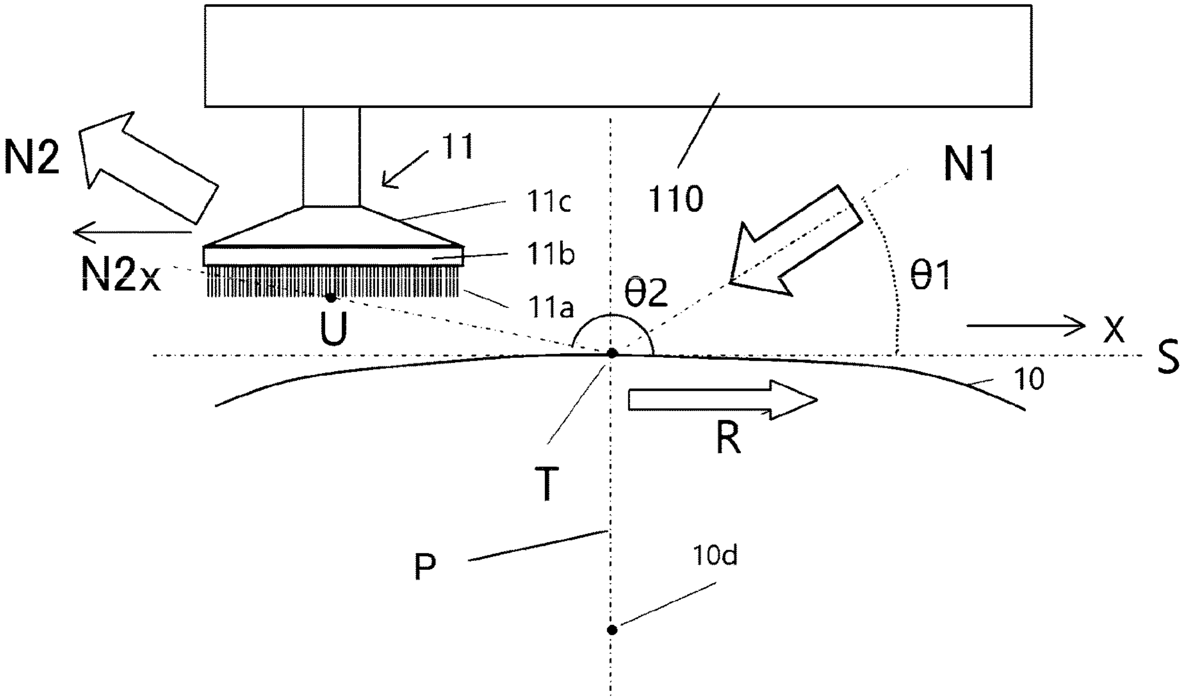
FIG. 1C is an explanatory view of the contacting/separating operation of the brush member according to embodiment 1.

Next, arrangement of the brush member 11 in relation to the photosensitive drum 10 according to embodiment 1 will be described with reference to FIGS. 1A to 1C. The brush member 11 is supported by a base member 11*c* adhered to the base fabric 11*b*. The base member 11*c* is supported by a moving mechanism 110 provided to the apparatus main body A of the image forming apparatus 100, so that the moving mechanism 110 can relatively move the brush member 11 toward the photosensitive drum 10. The brush member 11 and the photosensitive drum 10 are relatively movable to a first position at which the leading ends of the pile yarns 11*a* separate from the surface of the photosensitive drum 10 and a third position that is different from the first position, and a second position at which the leading ends of the pile yarns 11*a* come into contact with the surface of the photosensitive drum 10. FIG. 1A illustrates a state where the relative position of the photosensitive drum 10 and the brush member 11 is the first position. FIG. 1B illustrates a state where the relative position of the photosensitive drum 10 and the brush member 11 is the second position. FIG. 1C illustrates a state where the relative position of the photosensitive drum 10 and the brush member 11 is the third position.

The moving mechanism 110 can relatively move the photosensitive drum 10 and the brush member 11 such that the relative position of the photosensitive drum 10 and the brush member 11 moves from the first position to the second position, and then from the second position to the third position as illustrated in FIGS. 1A to 1C.

Contact of Brush Member 11 and Photosensitive Drum 10

At a time of stop, as illustrated in FIG. 1A, the brush member 11 and the photosensitive drum 10 are separate, and the brush member 11 is located at a retracted position. At a time of image formation, the base member 11*c* is pressed in an arrow N1 (see FIG. 1B) direction by a pressing mechanism included in the moving mechanism 110. Thus, the brush member 11 moves from the retracted position in FIG. 1A to the contact position with respect to the photosensitive drum 10 in FIG. 1B, and comes into contact with the photosensitive drum 10 with a predetermined contact pressure (above-described maximum contact pressure=0.7 to 3.5 gf/mm$^2$).

As illustrated in FIG. 1B, the relative approaching direction N1 of the brush member 11 to the photosensitive drum 10 upon relative movement of the photosensitive drum 10 and the brush member 11 from the first position to the second position is a direction from a downstream side to an upstream side in the rotation direction R of the photosensitive drum 10.

A point in the contact range (denoted by 11*e*) of the leading ends of the pile yarns 11*a* and the surface of the photosensitive drum 10 at a time when the relative position of the photosensitive drum 10 and the brush member 11 is at the second position on a virtual plane perpendicular to a rotary axis 10*d* of the photosensitive drum 10 is T. In this regard, the point T is a point at a center portion in the lateral direction of the contact range 11*e*. Furthermore, a direction parallel to a tangential line S of the surface of the photosensitive drum 10 at the point T is an X direction. At this time, a direction of an X direction component N1*x* of the approaching direction N1 is an opposite direction to the rotation direction R at the point T of the photosensitive drum 10. In other words, an inner product of a vector (indicated by the arrow N1) in the approaching direction and a vector (indicated by the arrow R) in the rotation direction at the point T of the photosensitive drum 10 is a negative value.

In embodiment 1, the pressing direction N1 of the pressing mechanism against the brush member 11 faces the upstream side in the rotation direction R of the photosensitive drum 10 seen from a straight line P that connects the rotary axis 10*d* of the photosensitive drum 10 and a lateral center 11*d* of the brush member 11 at the contact position. By pressing the brush member 11 in this pressing direction N1, the pile yarns 11*a* start coming into contact with the surface of the photosensitive drum 10 while receiving a force in the rotation direction R of the photosensitive drum 10. The brush member 11 moves to the predetermined contact position while being further pressed in the same direction in this state, and, as a result, the pile yarns 11*a* fall uniformly in the rotation direction R of the photosensitive drum 10.

An angle formed by a straight line that passes the point T and is parallel to approaching direction N1 and a straight line (tangential line S) that passes the point T and is parallel to the rotation direction R at the point T on the virtual plane perpendicular to the rotary axis 10*d* of the photosensitive drum 10 is $\theta 1$. As $\theta 1$ becomes smaller, the pile yarns 11*a* are more likely to receive the force in the rotation direction of the photosensitive drum 10. Consequently, it is possible to more easily obtain an effect that the pile yarns 11*a* fall uniformly in the rotation direction R of the photosensitive drum 10. By contrast with this, as $\theta 1$ becomes larger, the directions of the pile yarns 11*a* become random, and therefore the effect that the pile yarns 11*a* fall uniformly in the rotation direction R of the photosensitive drum 10 is diminished. According to the inventors' study, a range of $0°\leq\theta 1\leq 60°$ is preferable.

Furthermore, as for a temporal relationship between a contacting operation start timing of the brush member 11 and a rotating operation start timing of the photosensitive drum 10, it becomes easier to obtain the above effect by placing the brush member 11 in contact with the photosensitive drum 10 after starting rotating the photosensitive drum 10.

Separation of Brush Member 11 and Photosensitive Drum 10

When image formation is finished, an operation of separating the brush member 11 from the photosensitive drum 10 is started. By separating the brush member 11 and lowering the contact pressure, it is possible to prevent creep deformation of the pile yarns 11*a*. Furthermore, a toner and other foreign materials adhered to the pile yarns 11*a* at a time of contact do not remain at the same places of the pile yarns 11*a* as a result of release of pressing, so that it is possible to prevent the toner and the foreign materials from being fixed to the pile yarns 11*a*.

Furthermore, when the brush member 11 moves in the opposite direction to the pressing direction N1 at a time of release of pressing following the same trajectory as that at the time of pressing (at the time of moving from the first position to the second position), the pile yarns 11*a* are released from being pressed while receiving a force in an opposite direction to the rotation direction of the photosensitive drum 10. In this case, the directions in which the pile yarns 11*a* fall are disordered, and the density of the leading end portions of the pile yarns 11*a* is likely to have sparseness and denseness. Hence, in embodiment 1, at the time of release of pressing of the brush member 11, the brush member 11 moves from the second position to the third position different from the first position as illustrated in FIG. 1C.

As illustrated in FIG. 1C, a relative separating direction N2 of the brush member 11 from the photosensitive drum 10 upon relative movement of the photosensitive drum 10 and the brush member 11 from the second position to the third position is a direction from the downstream side to the upstream side in the rotation direction R of the photosensitive drum 10. In other words, a direction of an X direction component N2*x* of the separating direction N2 is the opposite direction to the rotation direction R of the photosensitive drum 10. In still other words, an inner product of a vector (indicated by the arrow N2) in the separating direction and a vector (indicated by the arrow R) in the rotation direction of the photosensitive drum 10 is a negative value.

An angle formed by a straight line that passes the point T and is parallel to the separating direction N2 and a straight line that passes the point T and is parallel to the rotation direction R at the point T is θ2. θ2 is a right angle or an obtuse angle, and is preferably $90° \leq \theta 2 \leq 180°$. In other words, in embodiment 1, during the separating operation, too, the brush member 11 is separated in the same direction as the pressing direction N1 at the time of contact. By so doing, the pile yarns 11*a* continue receiving the force in the same direction as the rotation direction R of the photosensitive drum 10 during the pressing releasing operation, too, so that the uniform directions of the pile yarns 11*a* are maintained. After the pressing releasing operation is finished, the brush member 11 returns to the retracted position (first position), and waits for a next image forming operation.

If the brush member 11 and the photosensitive drum 10 are separate in such a manner that there is no contact portion therebetween at the time of release of pressing, it is possible to more effectively obtain the effect that the uniform directions of the pile yarns 11*a* are maintained. Note that, when even part of the brush member 11 and the photosensitive drum 10 are separate, the above effect is obtained.

As illustrated in FIGS. 1A to 1C, in embodiment 1, the position of the brush member 11 at the first position (FIG. 1A) is on the downstream side of the position of the brush member 11 at the second position (FIG. 1B) in the rotation direction R of the photosensitive drum 10. Furthermore, the position of the brush member 11 at the third position (FIG. 1C) is on the upstream side of the position of the brush member 11 at the second position (FIG. 1B).

Embodiment 1 has described the example where the moving mechanism 110 relatively moves the photosensitive drum 10 and the brush member 11 by moving the brush member 11 toward the photosensitive drum 10. However, the present invention is not limited to this. The moving mechanism 110 may be configured to move the photosensitive drum 10 toward the brush member 11, or may be configured to move both of the photosensitive drum 10 and the brush member 11.

The moving mechanism 110 may be configured to be able to move the relative position of the photosensitive drum 10 and the brush member 11 from the third position to the first position. Consequently, when moving the photosensitive drum 10 and the brush member 11 from the second position to the third position to separate once, and placing the photosensitive drum 10 and the brush member 11 in contact with each other again, the moving mechanism 110 can return the photosensitive drum 10 and the brush member 11 to the first position, and then move the photosensitive drum 10 and the brush member 11 to the second position. Consequently, when the brush member 11 is placed in contact with the photosensitive drum 10, it is possible to place the brush member 11 in contact with the photosensitive drum 10 while bringing the brush member 11 closer to the photosensitive drum 10 in the approaching direction N1 at all times. Consequently, it is possible to place the pile yarns 11*a* in contact with the photosensitive drum 10 in a state where the pile yarns 11*a* are more reliably and uniformly inclined in the certain direction, and prevent the density of the pile yarns 11*a* at the contact position from becoming sparse and dense. Consequently, it is possible to more reliably prevent occurrence of faulty image formation on the downstream side of the contact position in the rotation direction of the photosensitive drum 10.

Embodiment 2

A feature of embodiment 2 is that, as for contact and separation of the brush member 11 and the photosensitive drum 10, the brush member 11 is fixed and immobile, and the photosensitive drum 10 moves when pressed by the developing unit 20, and contacts and separates from the brush member 11. The apparatus main body A, the basic configuration of the cartridge B, and the same components of the brush member 11 as those in embodiment 1 will be assigned the same reference numerals and names, and detailed description thereof will be omitted. Embodiment 2 will mainly describe a configuration related to contact and separation.

Configuration of Photosensitive Drum

Figure 7:
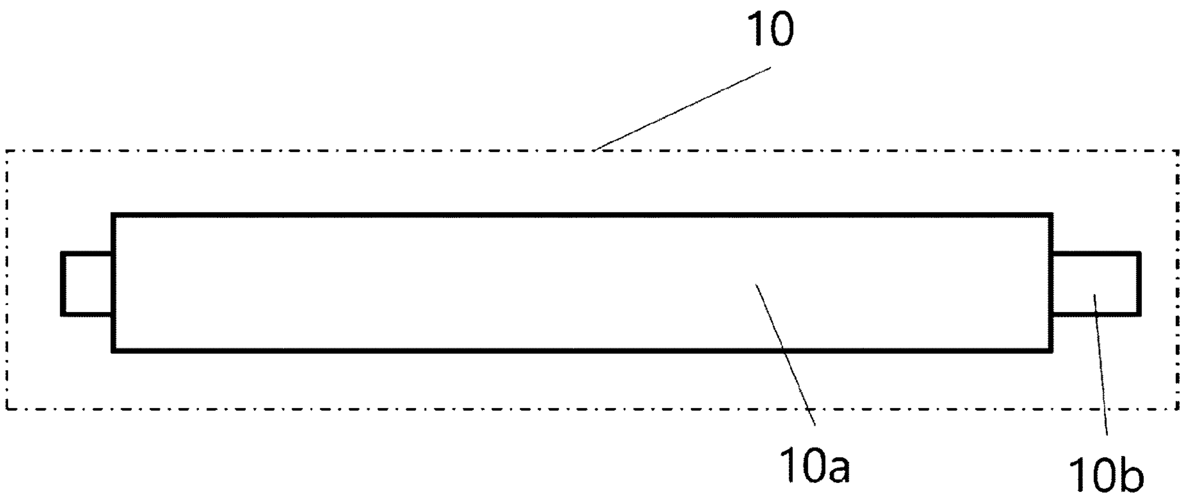
FIG. 7 is an explanatory view of a photosensitive drum unit according to embodiment 2.

A configuration to support the photosensitive drum 10 will be described. As illustrated in FIG. 7, the photosensitive drum 10 includes a cylinder 10*a* that is coated with a photosensitive layer, and shaft portions 10*b* that are provided on a longitudinal one end side and other end side of the cylinder 10*a* and support the cylinder 10*a*.

The shaft portions 10*b* that have columnar shapes having smaller diameters than the outer diameter of the cylinder 10*a* protrude from the both ends of the cylinder 10*a*. Furthermore, the shaft portions 10*b* of the photosensitive drum 10 are supported slidably on an inner surface of a hole portion (not illustrated) provided to a bearing member (not illustrated) that is a support member. The bearing member is provided to a frame body that constitutes the latent image unit B1.

Arrangement of the brush member 11 in relation to the photosensitive drum 10 in embodiment 2 will be described.

Hereinafter, the description will be given assuming that a rotation center at a time when the photosensitive drum 10 is located at a time of image formation is an origin O, and the lateral center 11*d* of the brush member 11 is located at a position of 12 o'clock seen from this origin O. Furthermore, areas on the same side as the brush member 11 seen from the origin O are a first quadrant and a second quadrant, and areas on the opposite side are a third quadrant and a fourth quadrant. Furthermore, a direction from the first quadrant to the fourth quadrant, a direction from the fourth quadrant to the third quadrant, a direction from the third quadrant to the second quadrant, and a direction from the second quadrant to the first quadrant are the same direction as the rotation direction R of the photosensitive drum 10. In embodiment 2, the brush member 11 is fixed to the apparatus main body A of the image forming apparatus 100, and the photosensitive drum 10 is configured to be relatively movable toward the brush member 11. In embodiment 2, there is provided the moving mechanism 110 that is configured to move the photosensitive drum 10 toward the brush member 11 by making the developing roller 25 come into contact with and press against the surface of the photosensitive drum 10. As a specific configuration of the moving mechanism 110 that makes the developing roller 25 come into contact with and separate from the surface of the photosensitive drum 10, and press against the photosensitive drum 10, a known drive transmission mechanism or biasing mechanism that uses a gear, an elastic member, or the like can be used as appropriate, and therefore detailed description thereof will be omitted.

Figure 8A:
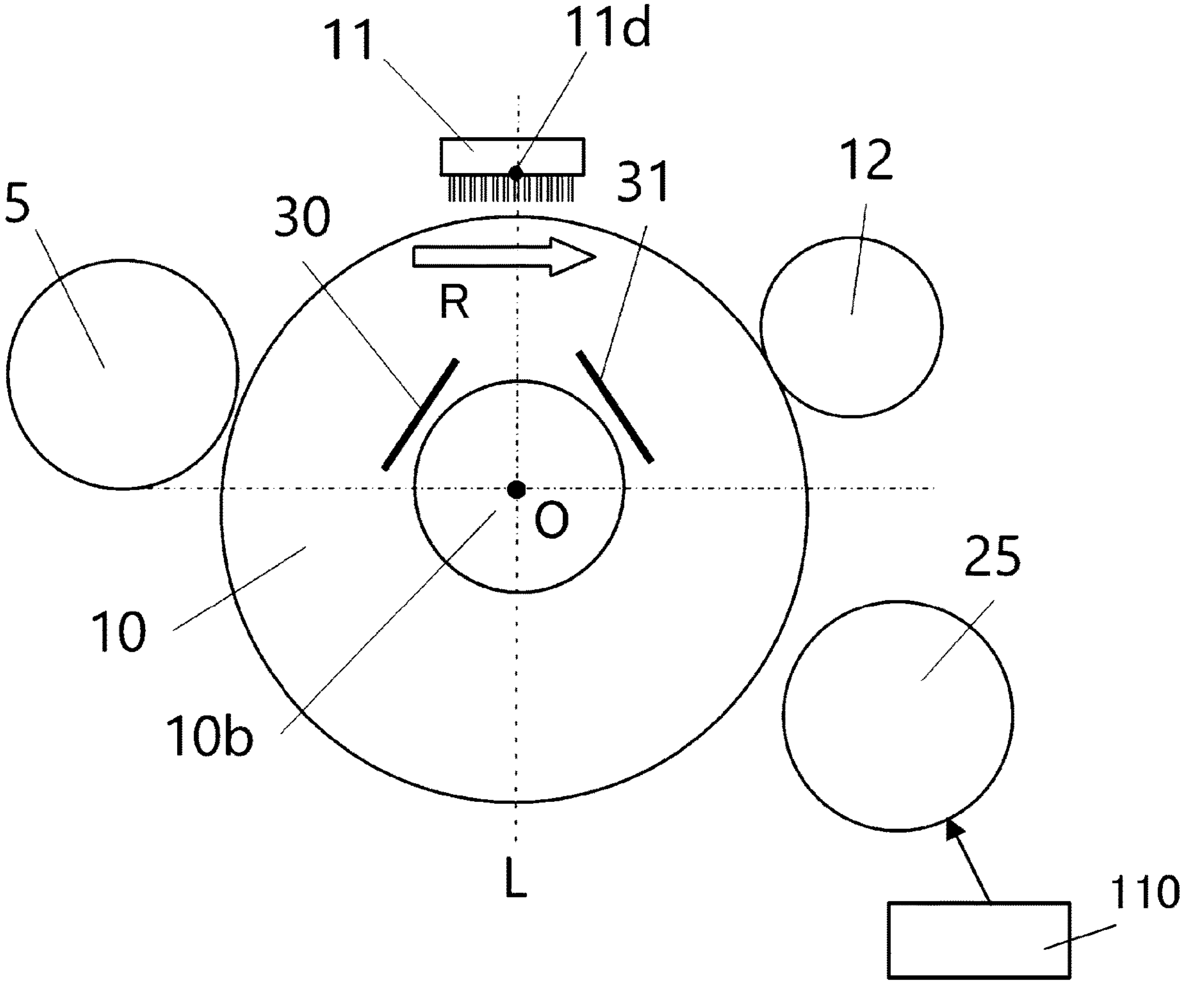
FIG. 8A is a view for describing a contacting/separating operation of a photosensitive drum according to embodiment 2.
Figure 8B:
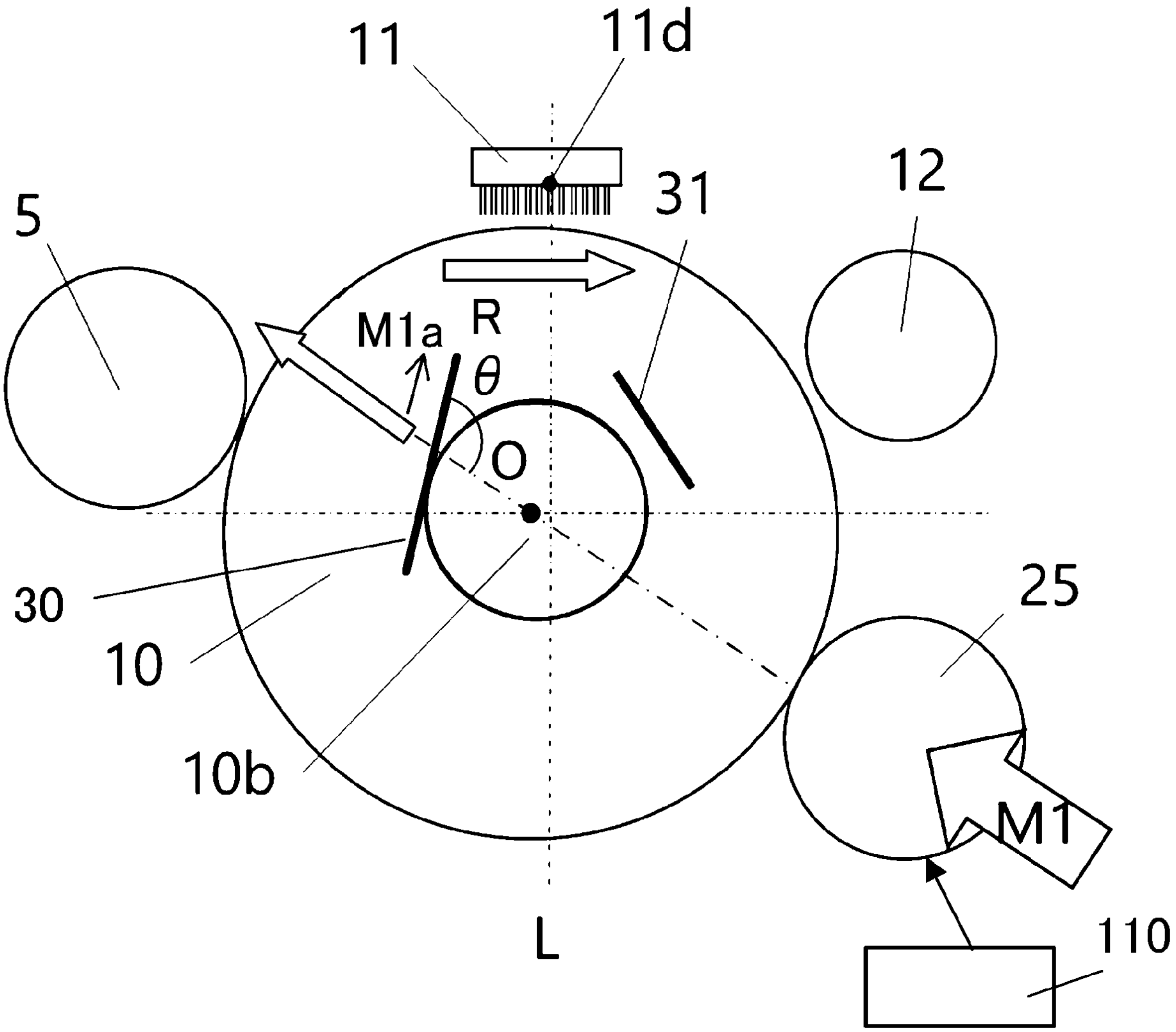
FIG. 8B is a view for describing the contacting/separating operation of the photosensitive drum according to embodiment 2.
Figure 8C:
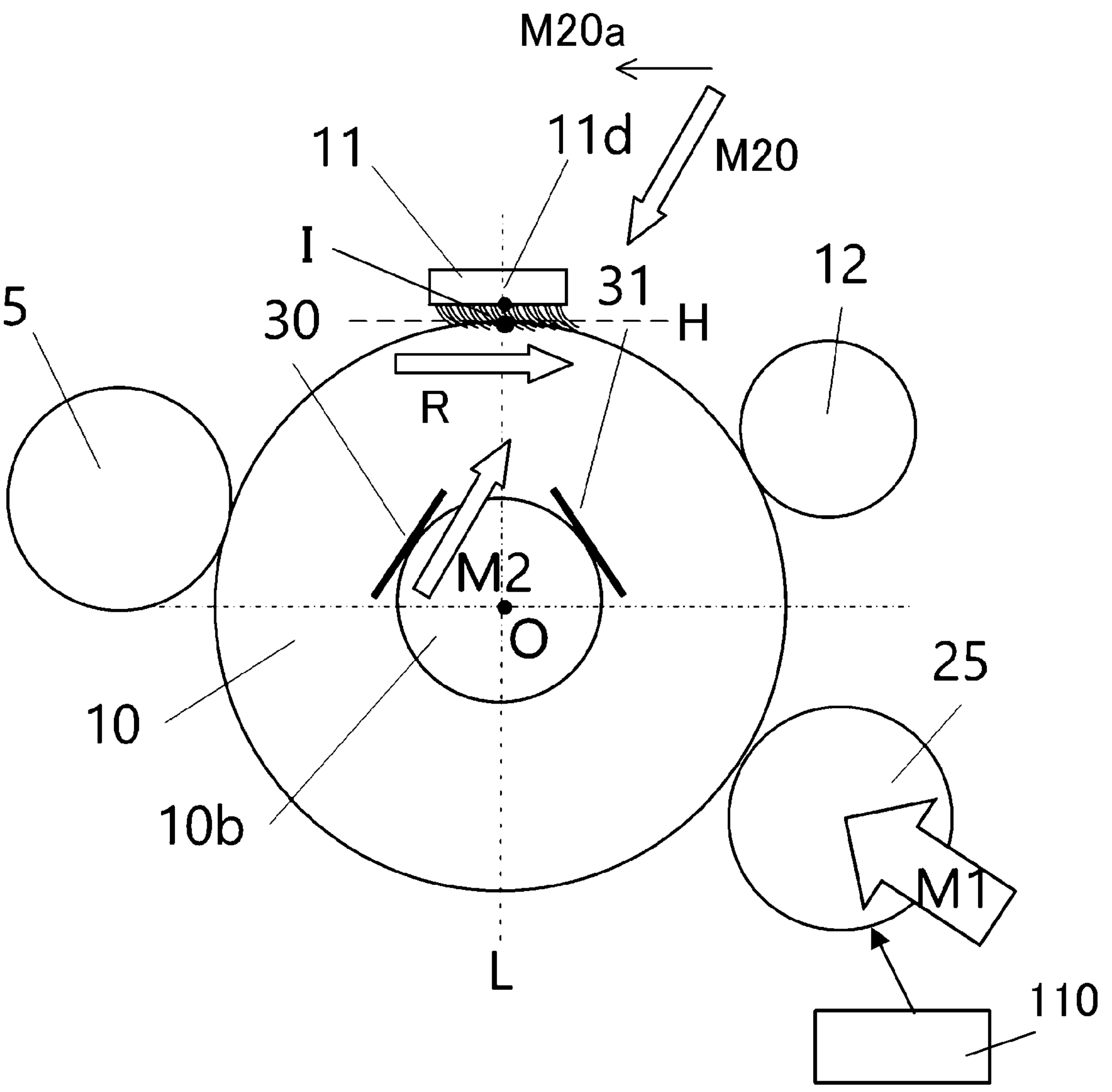
FIG. 8C is a view for describing the contacting/separating operation of the photosensitive drum according to embodiment 2.
Figure 8D:
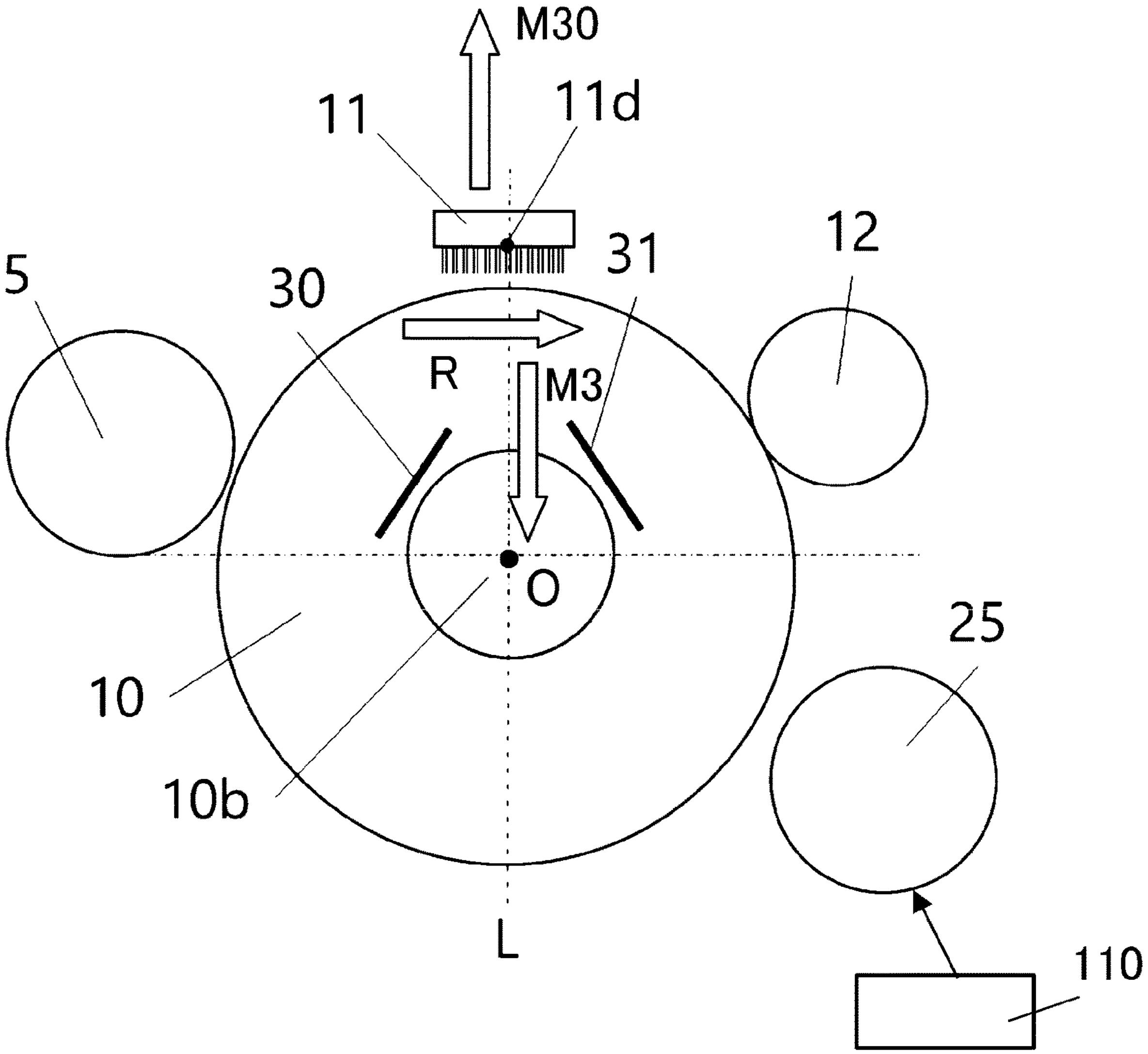
FIG. 8D is a view for describing the contacting/separating operation of the photosensitive drum according to embodiment 2.

The brush member 11 and the photosensitive drum 10 are relatively movable to the first position at which the leading ends of the pile yarns 11*a* separate from the surface of the photosensitive drum 10 and the third position that is different from the first position, and the second position at which the leading ends of the pile yarns 11*a* come into contact with the surface of the photosensitive drum 10. FIGS. 8A and 8B illustrate a state where the relative position of the photosensitive drum 10 and the brush member 11 is the first position. FIG. 8C illustrates a state where the relative position of the photosensitive drum 10 and the brush member 11 is the second position. FIG. 8D illustrates a state where the relative position of the photosensitive drum 10 and the brush member 11 is the third position.

Contact of Photosensitive Drum 10 and Brush Member 11

At the time of stop, as illustrated in FIG. 8A, the relative position of the brush member 11 and the photosensitive drum 10 is at the first position (retracted position) at which the leading ends of the pile yarns 11*a* of the brush member 11 separate from the surface of the photosensitive drum 10. At this time, the photosensitive drum 10 and the developing roller 25 located in the fourth quadrant are separate.

At the time of image formation, as illustrated in FIG. 8B, the developing roller 25 is first pressed in an arrow M1 direction by the moving mechanism 110, and comes into contact with the photosensitive drum 10. The photosensitive drum 10 is moved in the first direction M1 (pressing direction) by this pressing force, and thereby the shaft portion 10*b* of the photosensitive drum 10 contacts a first abutment surface 30 located in the second quadrant. The first direction M1 is a direction from the fourth quadrant to the second quadrant on the virtual plane perpendicular to the rotary axis of the photosensitive drum 10, and an angle θ formed by the first abutment surface 30 that contacts the shaft portion 10*b* of the photosensitive drum 10 in the second quadrant, and the first direction M1 is 90 degrees or more. In other words, a component M1*a* of the first direction M1 in a direction parallel to the first abutment surface 30 is a direction toward the brush member 11, i.e., a direction that moves away from the origin O. This contact changes a moving direction of the photosensitive drum 10 that is pressed toward the first direction M1 by the moving mechanism 110 with the developing roller 25 interposed therebetween to a second direction (arrow M2 direction) that is not parallel to the first direction M1 as illustrated in FIG. 8C. The second direction M2 is a direction that is parallel to the component M1*a* of the first direction M1 in the direction parallel to the first abutment surface 30.

When the photosensitive drum 10 is further pressed toward the first direction M1 by the moving mechanism 110 with the developing roller 25 interposed therebetween, the photosensitive drum 10 further moves in the second direction M2, and the surface of the photosensitive drum 10 comes into contact with the brush member 11. At this time, the relative position of the photosensitive drum 10 and the brush member 11 is at the second position (contact position) at which the leading ends of the pile yarns 11*a* come into contact with the surface of the photosensitive drum 10. As illustrated in FIG. 8C, a relative approaching direction M20 of the brush member 11 to the photosensitive drum 10 upon relative movement from the first position to the second position is an opposite direction to the second direction M2 in which the photosensitive drum 10 approaches the brush member 11. Furthermore, this approaching direction M20 is a direction from the downstream side to the upstream side in the rotation direction R of the photosensitive drum 10. Here, a point in the contact range of the leading ends of the pile yarns 11*a* and the surface of the photosensitive drum 10 at the time when the relative position of the photosensitive drum 10 and the brush member 11 is at the second position on the virtual plane perpendicular to the rotary axis of the photosensitive drum 10 is I. Here, the point I is a point at a center portion in the lateral direction of the contact range. Furthermore, a direction parallel to a tangential line H of the surface of the photosensitive drum 10 at the point I is a tangential direction. At this time, the direction of a tangential direction component M20*a* of the approaching direction M20 is an opposite direction to the rotation direction R at the point I of the photosensitive drum 10. In other words, an inner product of a vector in the approaching direction M20 and a vector in the rotation direction R at the point I of the photosensitive drum 10 is a negative value.

The moving direction M2 of the photosensitive drum 10 at the time of contact faces the downstream side in the rotation direction R of the photosensitive drum 10 seen from the straight line L that connects the origin O of the photosensitive drum 10 and the lateral center 11*d* of the brush member 11. Thus, the directions of the pile yarns 11*a* become uniform in the rotation direction R of the photosensitive drum 10. After the photosensitive drum 10 comes into contact with the brush member 11, the shaft portion 10*b* of the photosensitive drum 10 contacts a second abutment surface 31 located in the first quadrant, and a contacting operation is finished. When the relative position of the photosensitive drum 10 and the brush member 11 moves from the first position (retracted position) to the second position (contact position), the relative approaching direction M20 of the brush member 11 to the photosensitive drum 10 is from the downstream side to the upstream side in the rotation direction R at all times. Consequently, falling directions of the pile yarns 11*a* are uniformly the same direction, so that it is possible to prevent the density of the pile yarns 11*a* from becoming sparse and dense.

Figure 9A:
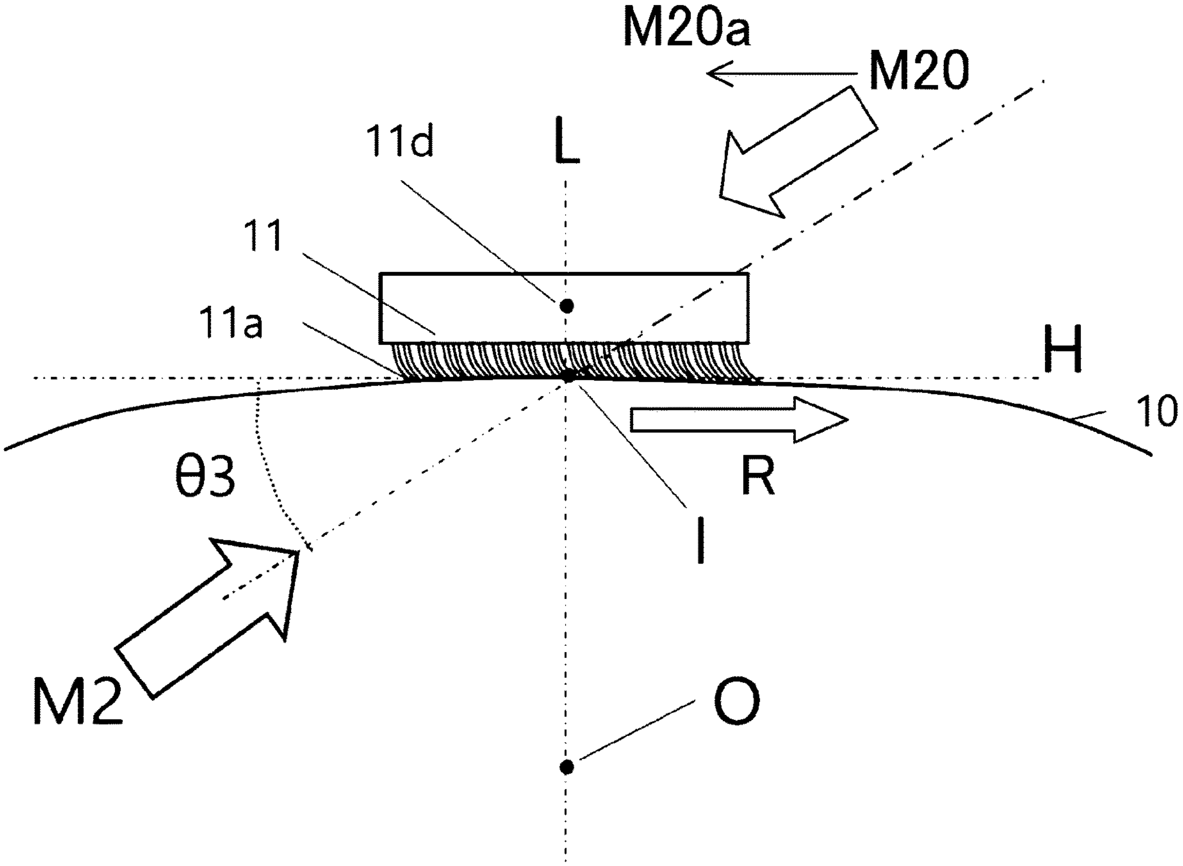
FIG. 9A is a view for describing the separating operation of the photosensitive drum according to embodiment 2.

FIG. 9A illustrates a state where the photosensitive drum 10 and the brush member 11 are at the second position (contact position). As illustrated in FIG. 9A, an angle formed by a straight line that passes the point I and is parallel to the approaching direction M20, and a straight line (tangential line H) that passes the point I and is parallel to the rotation direction R at the point I on the virtual plane perpendicular to the rotary axis of the photosensitive drum 10 is θ3. As θ3 becomes smaller, the pile yarns 11*a* are more likely to receive the force in the rotation direction of the photosensitive drum 10. Consequently, it is possible to easily obtain an effect that the pile yarns 11*a* fall uniformly in the rotation direction R of the photosensitive drum 10. By contrast with this, as θ becomes larger, the directions of the pile yarns 11*a* become random, and therefore the effect that the pile yarns 11*a* fall uniformly in the rotation direction R of the photosensitive drum 10 is diminished. According to the inventors' study, a range of 0°≤θ3≤60° is preferable.

Separation of Photosensitive Drum 10 and Brush Member 11

Figure 9B:
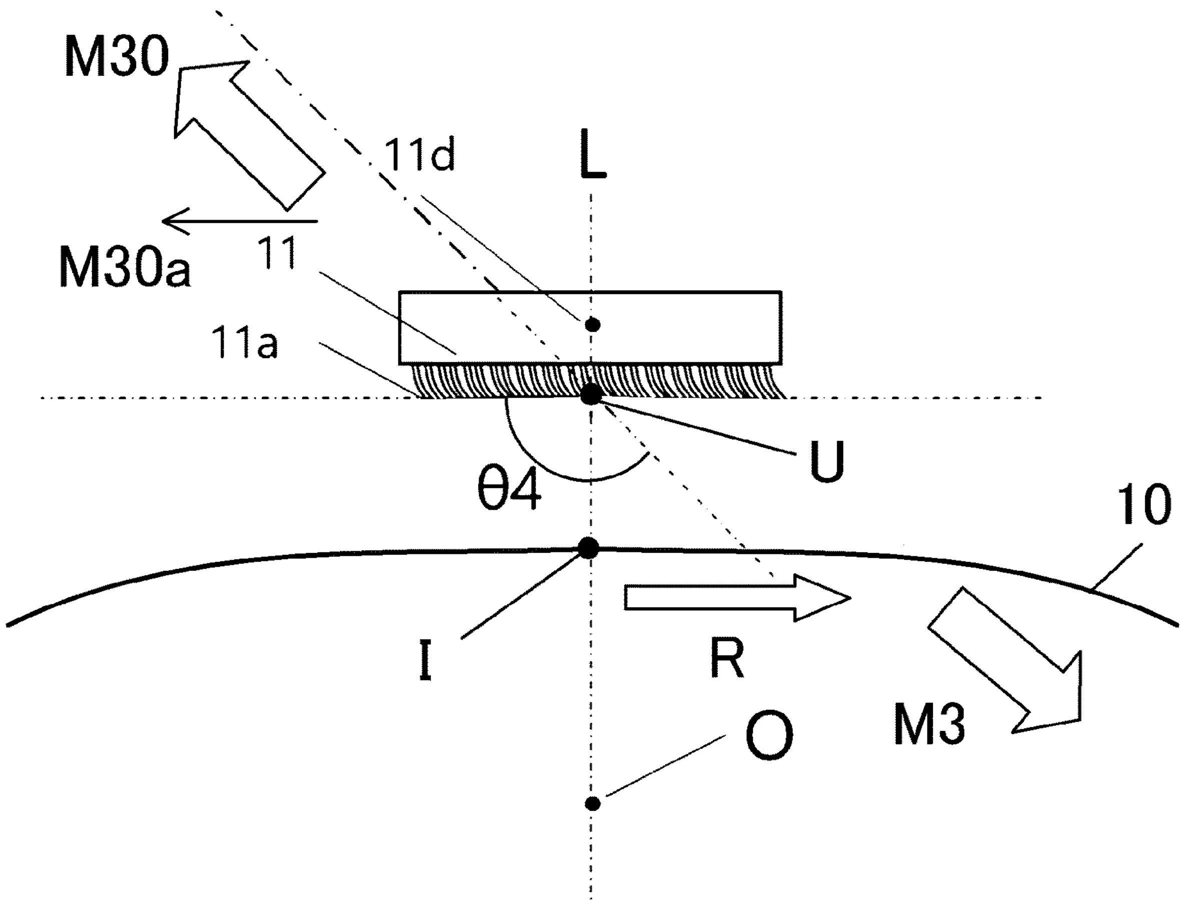
FIG. 9B is a view for describing the separating operation of the photosensitive drum according to embodiment 2.
Figure 10A:
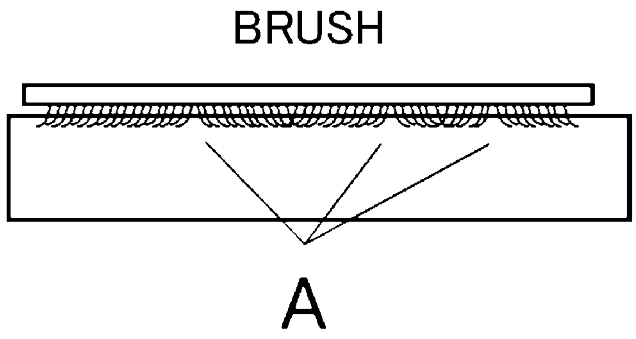
FIGS. 10A and 10B are explanatory views of a problem solved by the invention.
Figure 10B:
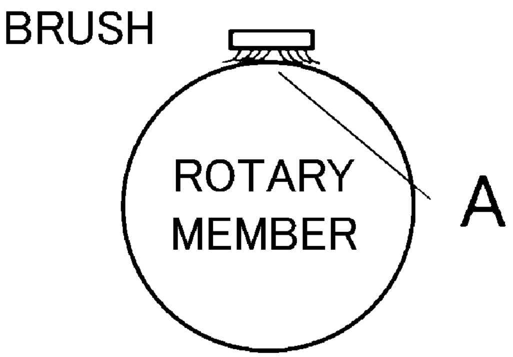

When image formation is finished, the operation of separating the brush member 11 from the photosensitive drum 10 is started as illustrated in FIG. 9B. At this time, when the photosensitive drum 10 moves in an opposite direction in the same route as a route through which the photosensitive drum 10 moves from the first position (separation position) to the second position (contact position), the pile yarns 11*a* are released from being pressed while receiving the force in the opposite direction to the rotation direction R of the photosensitive drum 10. In this case, the directions of the pile yarns 11*a* are likely to be disordered. Hence, in embodiment 2, at the time when the brush member 11 is released from being pressed, the brush member 11 moves from the second position toward the third position (the separation position different from the first position) through a route different from the route from the first position to the second position. As illustrated in FIG. 9B, upon relative movement of the photosensitive drum 10 and the brush member 11 from the second position to the third position, the moving mechanism 110 moves the photosensitive drum 10 such that the photosensitive drum 10 separates from the brush member 11 in a third direction M3. A relative separating direction M30 of the brush member 11 from the photosensitive drum 10 upon relative movement from the second position illustrated in FIG. 9A to the third position illustrated in FIG. 9B is an opposite direction to the third direction M3 in which the photosensitive drum 10 separates from the brush member 11. Furthermore, this separating direction M30 is a direction from the downstream side to the upstream side in the rotation direction R of the photosensitive drum 10. In other words, a direction of a tangential direction component M30*a* of the separating direction M30 is an opposite direction to the rotation direction R at the point I of the photosensitive drum 10. In other words, an inner product of a vector in the separating direction M30 and a vector in the rotation direction R at the point I of the photosensitive drum 10 is a negative value.

The position of the brush member 11 at which the brush member 11 is in contact with the photosensitive drum 10 at the point I at the second position (contact position) in FIG. 9A, and corresponds to the point I is a point U. As illustrated in FIG. 9B, in a case where an angle formed by a straight line that passes the point U and is parallel to the separating direction M30 and a straight line that passes the point U and is parallel to the tangential line H on the virtual plane perpendicular to the rotary axis of the photosensitive drum 10 is θ4, a range of 90°≤θ4≤180° is preferable. By so doing, the pile yarns 11*a* continue receiving the force in the same direction as the rotation direction R of the photosensitive drum 10 during a pressing releasing operation, too, so that the uniform directions of the pile yarns 11*a* are maintained.

Note that, in embodiment 2, when moving from the first position in FIG. 8A to the second position in FIG. 8C, the photosensitive drum 10 moves in a route through which the photosensitive drum 10 abuts on the first abutment surface 30 as illustrated in FIG. 8B. By contrast with this, according to an operation of separating the photosensitive drum 10 from the second position in FIG. 8C to the third position in FIG. 8D, the photosensitive drum 10 separates from the brush member 11 in a route through which the photosensitive drum 10 does not abut on the first abutment surface 30. More specifically, when image formation is finished, the moving mechanism 110 operates such that the developing roller 25 separates from the photosensitive drum 10. This separating operation stops pressing against the photosensitive drum 10, and then the photosensitive drum 10 is separated from the brush member 11 by the own weight of the photosensitive drum 10. In this case, θ4=90° holds. By employing this configuration, it is possible to simplify the configuration of the moving mechanism 110 compared to the configuration of the moving mechanism 110 that is necessary to implement the separating operation illustrated in FIGS. 9A and 9B. According to this configuration, it is also possible to make the third position in FIG. 8D and the first position in FIG. 8A the same position. In this case, the moving mechanism 110 relatively moves the photosensitive drum 10 and the brush member 11 such that a route through which the relative position of the photosensitive drum 10 and the brush member 11 moves from the first position to the second position, and a route through which the relative position moves from the second position to the third position (=first position) are different. More specifically, as described above, the approaching direction M20 in which the brush member 11 relatively approaches the photosensitive drum 10 faces the upstream side in the rotation direction R of the photosensitive drum 10. Furthermore, the separating direction M30 in which the brush member 11 relatively separates from the photosensitive drum 10 does not face the downstream side in the rotation direction R of the photosensitive drum 10. By so doing, the pile yarns 11*a* do not continue receiving the force in the same direction as the rotation direction R of the photosensitive drum 10 during the pressing releasing operation, yet do not receive the force in the opposite direction to the rotation direction R, either, so that it is possible to prevent the pile yarns 11*a* from being disordered. Consequently, it is possible to prevent the density of the pile yarns 11*a* from becoming sparse and dense.

After the pressing releasing operation is finished, the photosensitive drum 10 returns to the retracted position, and waits for a next image forming operation. Subsequently, the same operation is repeated.

Embodiment 3

Embodiments 1 and 2 have described the contacting/separating method citing as the example the photosensitive drum 10 and the brush member 11 that are the rotatable rotary member and the brush member that is relatively movable toward the rotary member. However, the rotatable rotary member is not limited to the photosensitive drum 10. The present invention can be applied likewise to other rotary members (a transfer roller and a charging roller (charging member)) of electrophotographic systems that are rotatable rotary members to obtain the above effect. Furthermore, the present invention can be applied to the contacting/separating method for a movable moving member and a brush member that is relatively movable toward the moving member to obtain the same effect as those of above embodiments 1 and 2. Such a moving member can be exemplified as a photosensitive belt or a transfer belt (transfer member). Hereinafter, the embodiment where the present invention is applied to a contacting/separating method for a transfer belt and a brush member will be described.

Figure 11:
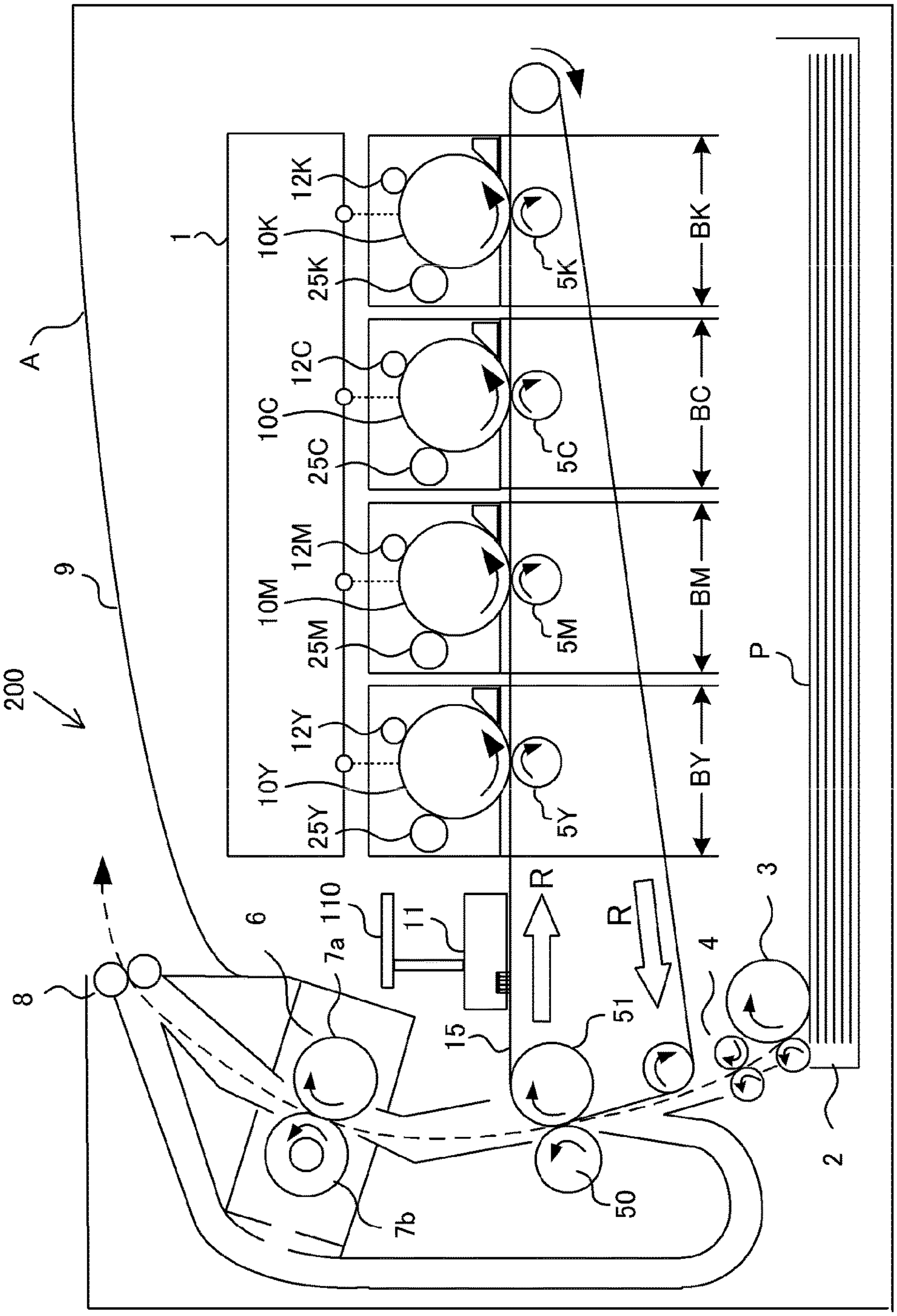
FIG. 11 is a view illustrating an image forming apparatus according to embodiment 3.

FIG. 11 illustrates the embodiment where the present invention is applied to an image forming apparatus configured to primarily transfer a toner image from a photosensitive drum to a transfer belt, and then secondarily transfer the toner image from the transfer belt to a recording material. The same components as those in embodiment 1 will be assigned the same reference numerals in FIG. 11, and detailed description thereof will be omitted. An image forming apparatus 200 illustrated in FIG. 11 includes four image forming units that transfer a toner image of toners (developers) of four colors of yellow (Y), magenta (M), cyanogen (C), and black (K) onto a transfer belt 15. In FIG. 11, the image forming units are distinguished by symbols Y, M, C, and K indicating the colors. For example, the image forming unit that forms and transfers a yellow toner image includes a photosensitive drum 10Y, a charging roller 12Y, a developing roller 25Y, and a transfer roller 5Y. An electrostatic latent image corresponding to the yellow image is formed on the surface of the photosensitive drum 10Y, and a developing apparatus including the developing roller 25Y develops the yellow toner image on the photosensitive drum 10Y (on an image bearing member). The image forming apparatus 200 includes the transfer belt 15 that is an endless belt wound around and rotatably supported by a plurality of rollers. The transfer belt 15 moves in the arrow R direction. The yellow toner image formed on the photosensitive drum 10Y is primarily transferred to the transfer belt 15 by a primary transfer member formed between the transfer roller 5Y and the photosensitive drum 10Y. A magenta toner image, a cyanogen toner image, and a black toner image are primarily transferred sequentially to the transfer belt 15 likewise, and a full-color toner image is formed. The full-color toner image formed on the transfer belt 15 is secondarily transferred to the recording material P by a secondary transfer member including secondary transfer rollers 50 and 51. A process after the secondary transfer is the same as that in embodiment 1. An untransferred toner remaining on the transfer belt 15 after the secondary transfer is cleaned by the brush member 11 that can come into contact with the transfer belt 15. The configuration of the brush member 11 is the same as that of embodiment 1.

Figure 12A:
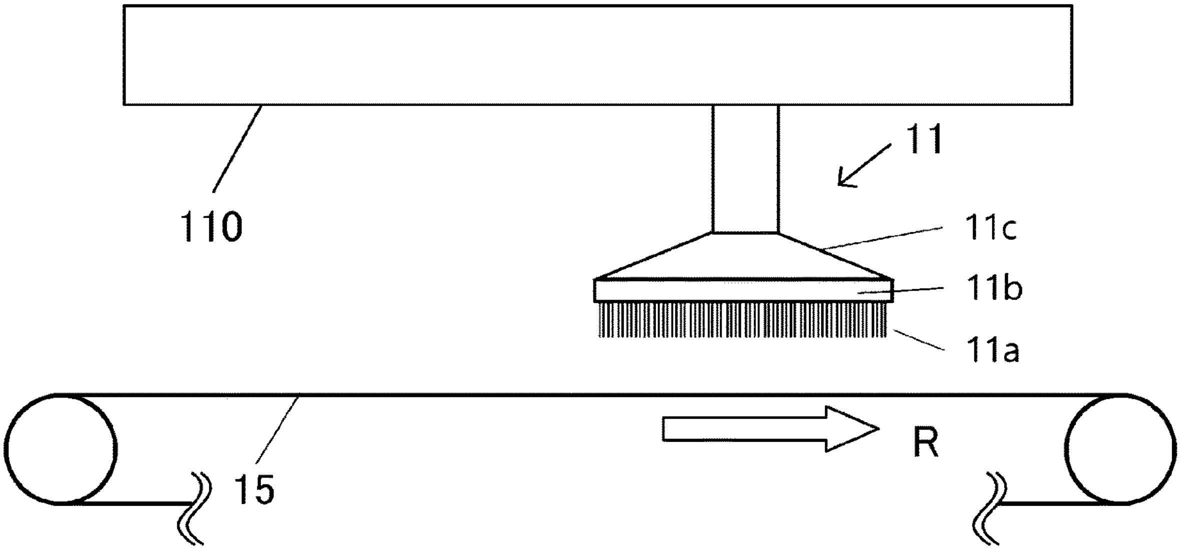
FIG. 12A is a view for describing the contacting/separating operation of the photosensitive drum according to embodiment 3.
Figure 12B:
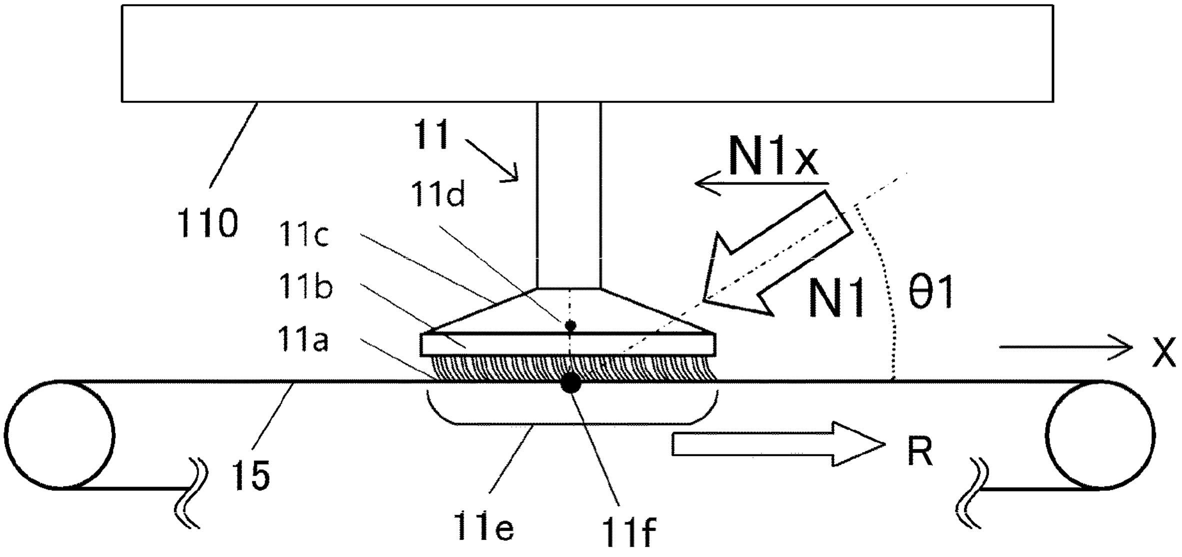
FIG. 12B is a view for describing the contacting/separating operation of the photosensitive drum according to embodiment 3.
Figure 12C:
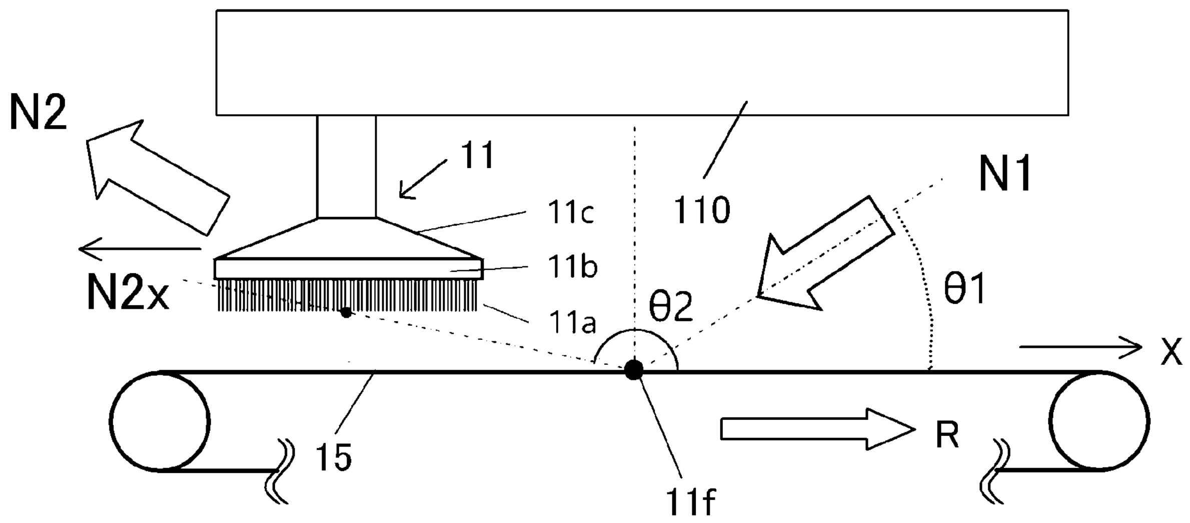
FIG. 12C is a view for describing the contacting/separating operation of the photosensitive drum according to embodiment 3.

The image forming apparatus 200 includes the moving mechanism 110 that relatively moves the brush member 11 and a transfer belt 15 that is a moving member. FIG. 11 illustrates a state where the relative position of the brush member 11 and the transfer belt 15 is at the second position at which the leading ends of the fiber yarns of the brush member 11 come into contact with the surface of the transfer belt 15. In addition, the relative position of the transfer belt 15 and the brush member 11 can take the first position at which the leading ends of the fiber yarns of the brush member 11 separate from the surface of the transfer belt 15, and a third position at which the leading ends of the fiber yarns of the brush member 11 separate from the surface of the transfer belt 15, and that is different from the first position. FIG. 12A illustrates a state where the relative position of the transfer belt 15 and the brush member 11 is the first position. FIG. 12B illustrates a state where the relative position of the transfer belt 15 and the brush member 11 is the second position. FIG. 12C illustrates a state where the relative position of the transfer belt 15 and the brush member 11 is the third position.

The moving mechanism 110 can relatively move the transfer belt 15 and the brush member 11 such that, as illustrated in FIGS. 12A to 12C, the relative position of the transfer belt 15 and the brush member 11 moves from the first position to the second position, and from the second position to the third position.

As illustrated in FIG. 12B, the approaching direction N1 of the brush member 11 to the transfer belt 15 upon relative movement of the transfer belt 15 and the brush member 11 from the first position to the second position is a direction from the downstream side to the upstream side in a moving direction R of the transfer belt 15. That is, in a case where a direction that is parallel to the surface of the transfer belt 15 and is perpendicular to a rotary axial direction of the secondary transfer rollers 50 and 51 and the like (see FIG. 11) that support the transfer belt 15 movably is the X direction, the direction of the X direction component N1*x* of the approaching direction N1 is an opposite direction to the moving direction R of the transfer belt 15. In still other words, an inner product of a vector (indicated by the arrow N1) in the approaching direction and a vector (indicated by the arrow R) in the moving direction of the transfer belt 15 is a negative value. An angle formed by a straight line that passes a point 11*f* in the contact range 11*e* of the leading ends of the pile yarns 11*a* and the surface of the transfer belt 15 at a time when the relative position of the transfer belt 15 and the brush member 11 is at the second position, and that is parallel to the approaching direction N1, and a straight line that passes the point 11*f* and is parallel to the moving direction R is $\theta 1$. $\theta 1$ is an acute angle, and is preferably $0° \leq \theta 1 \leq 60°$.

As illustrated in FIG. 12C, the separating direction N2 of the brush member 11 from the transfer belt 15 upon relative movement of the transfer belt 15 and the brush member 11 from the second position to the third position is a direction from the downstream side to the upstream side in the moving direction R of the transfer belt 15. In other words, the direction of the X direction component N2*x* of the separating direction N2 is the opposite direction to the moving direction R of the transfer belt 15. In still other words, an inner product of a vector (indicated by the arrow N2) in the separating direction and a vector (indicated by the arrow R) in the moving direction of the transfer belt 15 is a negative value. In still other words, an angle $\theta 2$ formed by a straight line that passes the point 11*f* and is parallel to the separating direction N2 and a straight line that passes the point 11*f* and is parallel to the moving direction R is a right angle or an obtuse angle, and is preferably $90° \leq \theta 2 \leq 180°$.

Embodiment 3 has described the example where the moving mechanism 110 relatively moves the transfer belt 15 and the brush member 11 by moving the brush member 11 toward the transfer belt 15. However, the present invention is not limited to this. The moving mechanism 110 may be configured to move the transfer belt 15 toward the brush member 11, or may be configured to move both of the transfer belt 15 and the brush member 11.

Furthermore, there may be employed a configuration where the relative position of the transfer belt 15 and the brush member 11 can be moved from the third position to the first position. Consequently, when the transfer belt 15 and the brush member 11 are moved from the second position to the third position and separated once, and then the transfer belt 15 and the brush member 11 are placed in contact again, the transfer belt 15 and the brush member 11 can be returned to the first position, and then moved to the second position. Consequently, when the brush member 11 is placed in contact with the transfer belt 15, it is possible to place the brush member 11 in contact with the transfer belt 15 while bringing the brush member 11 closer to the transfer belt 15 in the approaching direction N1 at all times. Consequently, it is possible to place the pile yarns 11*a* in contact with the transfer belt 15 in a state where the pile yarns 11*a* are more reliably and uniformly inclined in a certain direction, and prevent the density of the pile yarns 11*a* at the contact position from becoming sparse and dense. Consequently, it is possible to more reliably prevent occurrence of faulty image formation on the downstream side of the contact position in the moving direction of the transfer belt 15.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-179231, filed on Nov. 9, 2022, which is hereby incorporated by reference herein in its entirety.

What is claimed is:

1. An image forming apparatus comprising:

an image bearing member on which an electrostatic latent image is formed, and that is rotatable;

a charging member that charges the image bearing member and is rotatable;

a developing member that develops, as a developer image, the electrostatic latent image formed on the image bearing member;

a transfer member that transfers the developer image to a recording material; and a brush member that includes a fiber yarn and has a flat shape, and that can come into contact with a surface of the image bearing member at a downstream side with respect to the transfer member and at an upstream side with respect to the charging member in a rotation direction of the image bearing member, wherein the image bearing member and the brush member are relatively movable to a first position at which a leading end of the fiber yarn separates from the surface of the image bearing member, and a second position at which the leading end of the fiber yarn comes into contact with the surface of the image bearing member, and a relative approaching direction of the brush member to the image bearing member upon relative movement from the first position to the second position is a direction from a downstream side to an upstream side in the rotation direction of the image bearing member.

2. The image forming apparatus according to claim 1, wherein an angle θ1 satisfies 0°≤θ1≤60° on a virtual plane perpendicular to a rotary axis of the image bearing member, the angle θ1 being formed by a straight line that passes a point within a contact range of the leading end of the fiber yarn and the surface of the image bearing member at a time when a relative position of the image bearing member and the brush member is at the second position, and that is parallel to the approaching direction, and a straight line that passes the point and is parallel to the rotation direction at the point.

3. An image forming apparatus comprising:

an image bearing member on which an electrostatic latent image is formed, and that is rotatable;

a charging member that charges the image bearing member and is rotatable;

a developing member that develops, as a developer image, the electrostatic latent image formed on the image bearing member;

a transfer member that transfers the developer image to a recording material; and a brush member that includes a fiber yarn and has a flat shape, and that can come into contact with a surface of the image bearing member at a downstream side with respect to the transfer member and at an upstream side with respect to the charging member in a rotation direction of the image bearing member, wherein the image bearing member and the brush member are relatively movable to a first position at which a leading end of the fiber yarn comes into contact with the surface of the image bearing member, and a second position at which the leading end of the fiber yarn separates from the surface of the image bearing member, and a relative separating direction of the brush member from the image bearing member upon relative movement from the first position to the second position is a direction from a downstream side to an upstream side in the rotation direction of the image bearing member.

4. The image forming apparatus according to claim 3, wherein an angle θ2 satisfies 90°≤θ2≤180° on a virtual plane perpendicular to a rotary axis of the image bearing member, the angle θ2 being formed by a straight line that passes a point within a contact range of the leading end of the fiber yarn and the surface of the image bearing member at a time when a relative position of the image bearing member and the brush member is at the first position, and that is parallel to the separating direction, and a straight line that passes the point and is parallel to the rotation direction at the point.

5. An image forming apparatus comprising:

an image bearing member on which an electrostatic latent image is formed, and that is rotatable;

a charging member that charges the image bearing member and is rotatable;

a developing member that develops, as a developer image, the electrostatic latent image formed on the image bearing member;

a transfer member that transfers the developer image to a recording material; and a brush member that includes a fiber yarn and has a flat shape, and that can come into contact with a surface of the image bearing member at a downstream side with respect to the transfer member and at an upstream side with respect to the charging member in a rotation direction of the image bearing member, wherein the image bearing member and the brush member are relatively movable to a first position at which a leading end of the fiber yarn separates from the surface of the image bearing member, a second position at which the leading end of the fiber yarn comes into contact with the surface of the image bearing member, and a third position at which the leading end of the fiber yarn separates from the surface of the image bearing member, and that is different from the first position, and in the rotation direction of the image bearing member, a position of the brush member at the first position is on a downstream side with respect to the position of the brush member at the second position, and the position of the brush member at the third position is on an upstream side with respect to the position of the brush member at the second position.

6. An image forming apparatus comprising:

an image bearing member on which an electrostatic latent image is formed, and that is rotatable;

a charging member that charges the image bearing member and is rotatable;

a developing member that develops, as a developer image, the electrostatic latent image formed on the image bearing member;

a transfer member that transfers the developer image to a recording material; and a brush member that includes a fiber yarn and has a flat shape, and that can come into contact with a surface of the image bearing member at a downstream side with respect to the transfer member and at an upstream side with respect to the charging member in a rotation direction of the image bearing member, wherein the image bearing member and the brush member are relatively movable to a first position at which a leading end of the fiber yarn separates from the surface of the image bearing member, a second position at which the leading end of the fiber yarn comes into contact with the surface of the image bearing member, and a third position at which the leading end of the fiber yarn separates from the surface of the image bearing member, and that is different from the first position, and a relative approaching direction of the brush member to the image bearing member upon relative movement from the first position to the second position, and a relative separating direction of the brush member from the image bearing member upon relative movement from the second position to the third position is a direction from a downstream side to an upstream side in the rotation direction of the image bearing member.

* * * * *